Feb. 24, 1970  L. VITA  3,497,087
AUTOMATIC VEHICLE PARKING SYSTEM
Filed Jan. 19, 1968  9 Sheets-Sheet 1

INVENTOR
*LAWRENCE VITA*
BY
*Edward F. Levy*
ATTORNEY

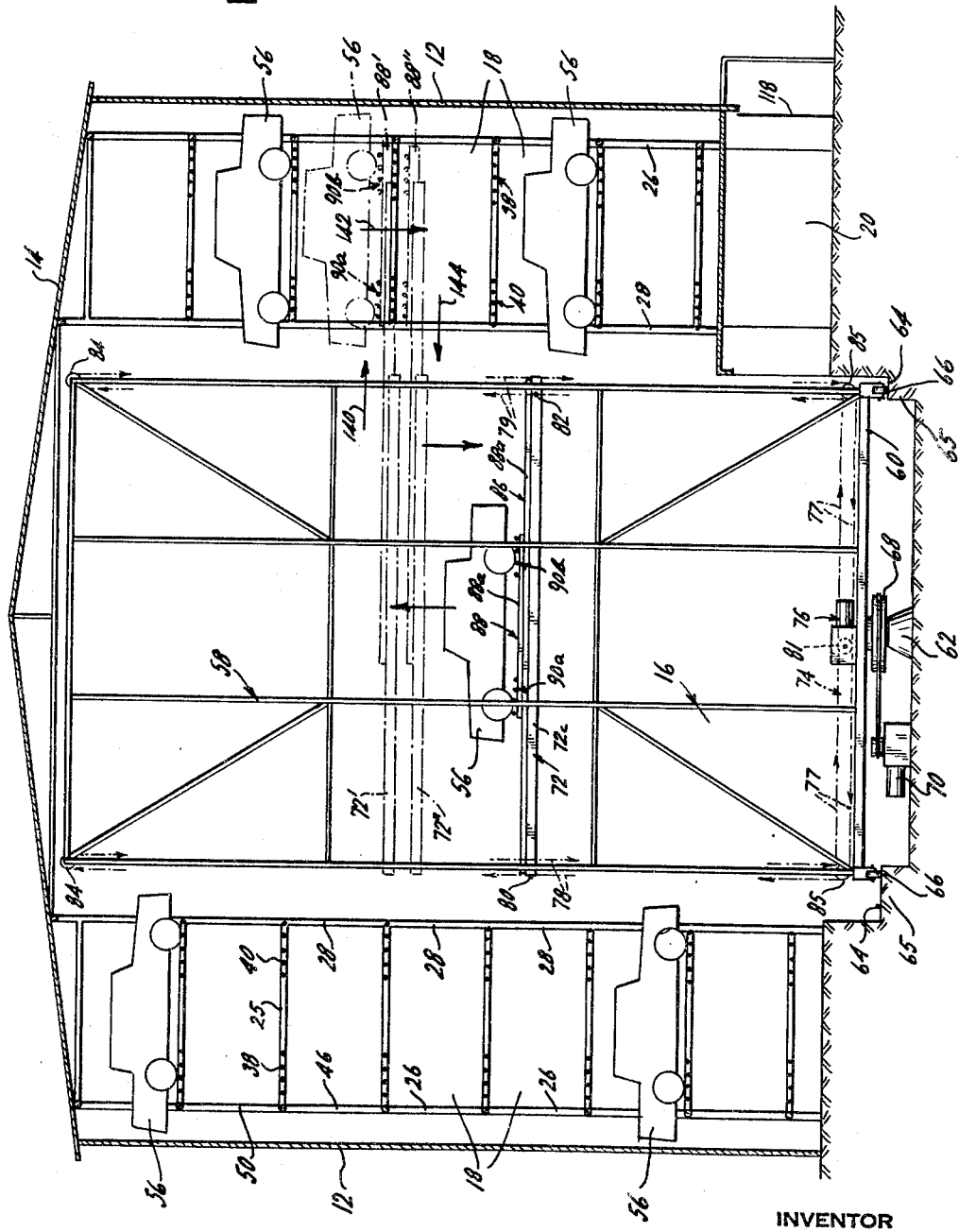

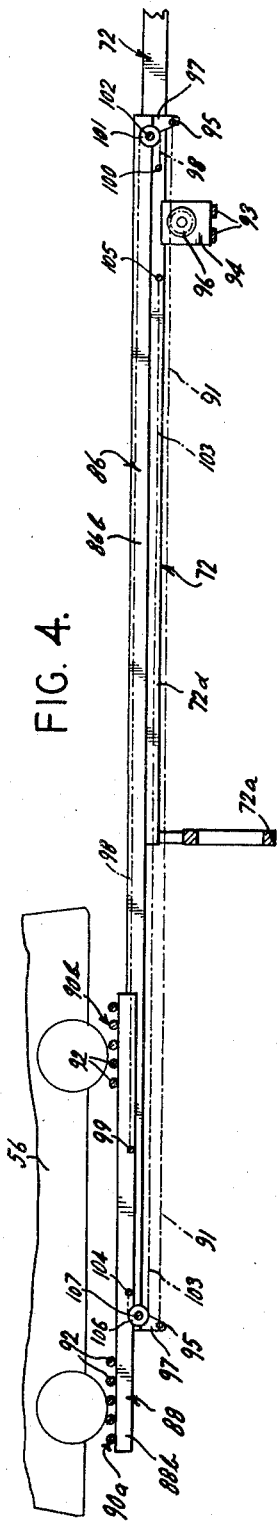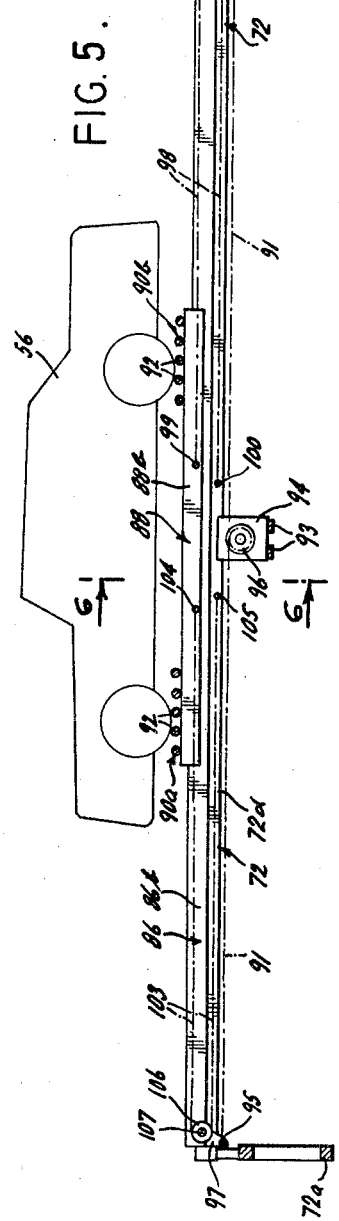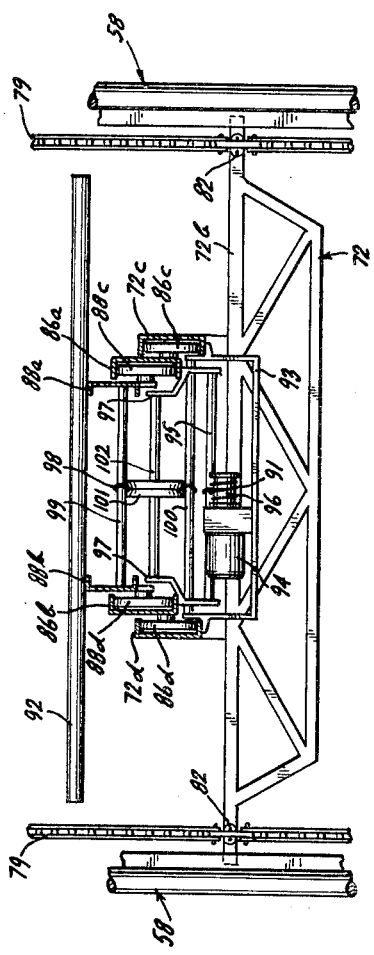

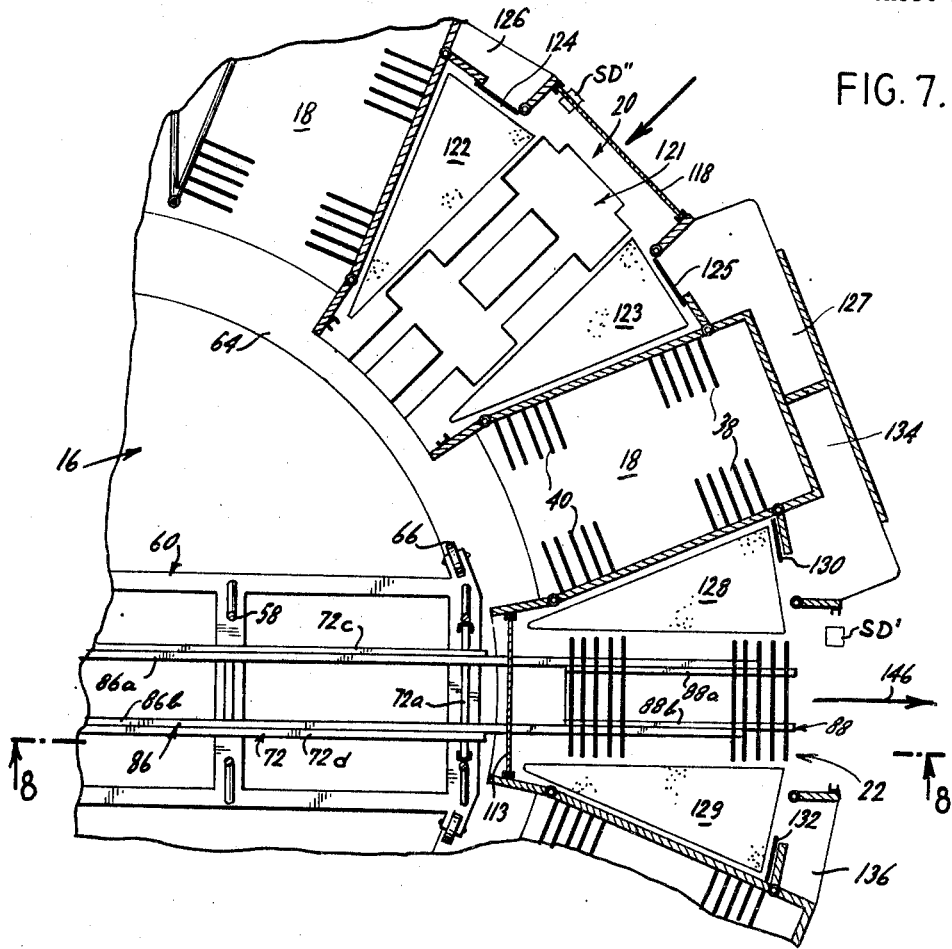
FIG. 7.
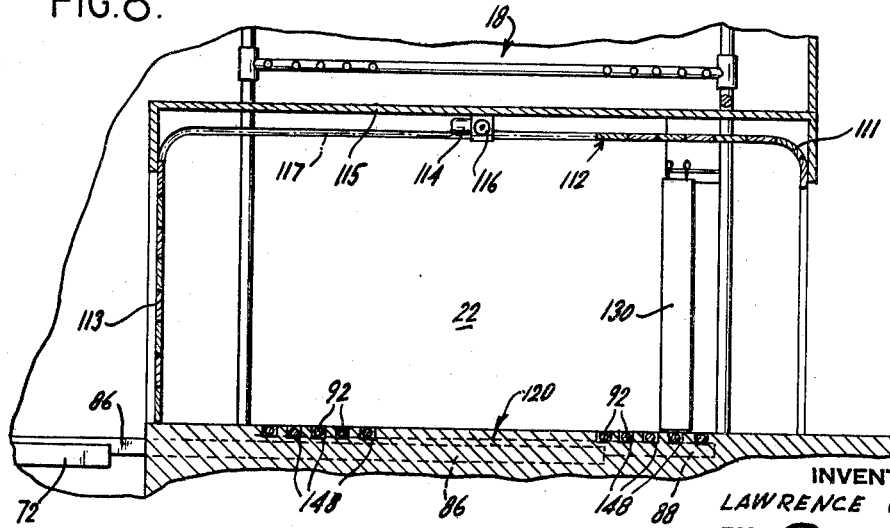
FIG. 8.
INVENTOR
LAWRENCE VITA
BY
ATTORNEY

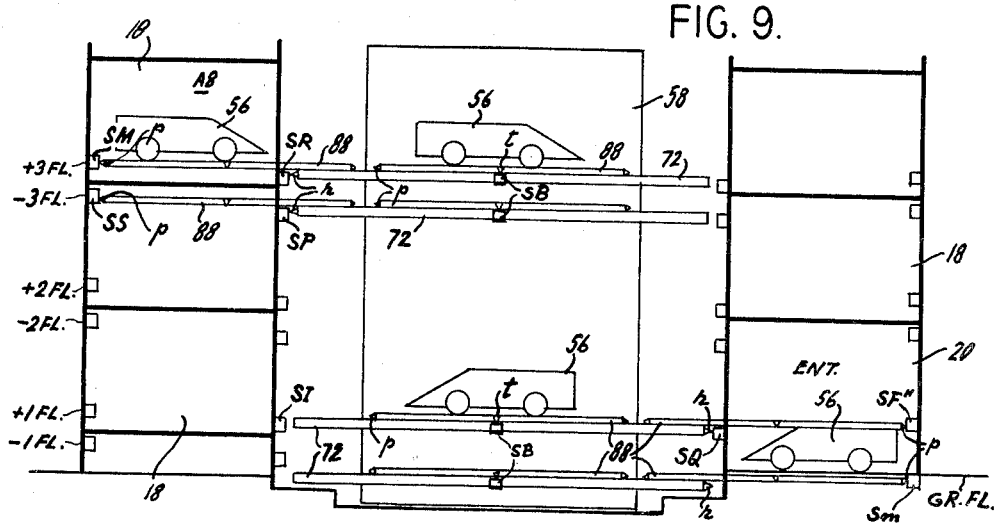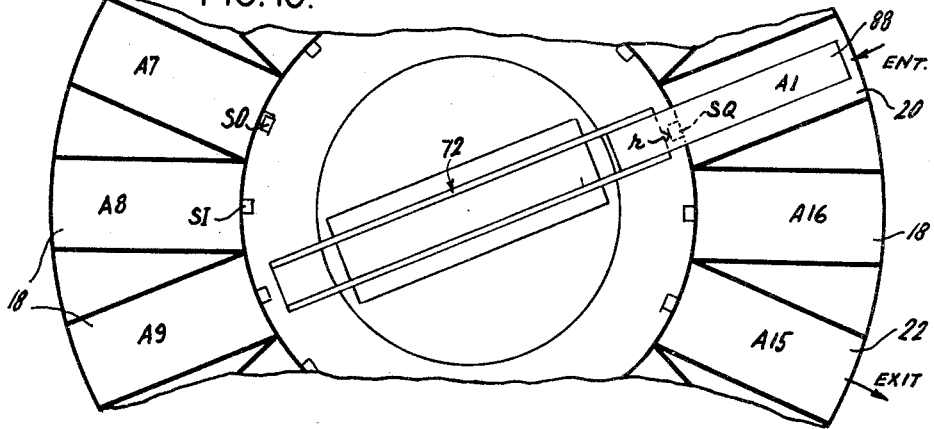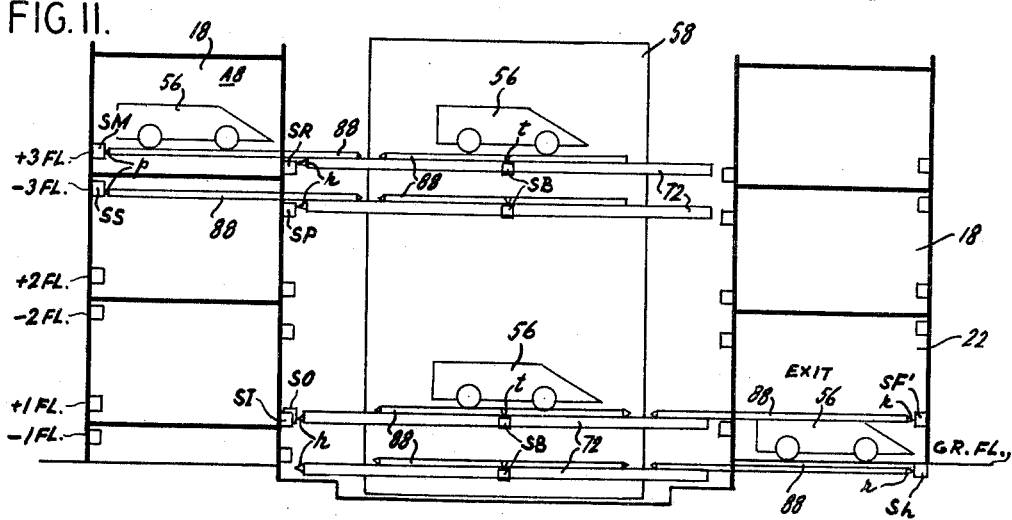

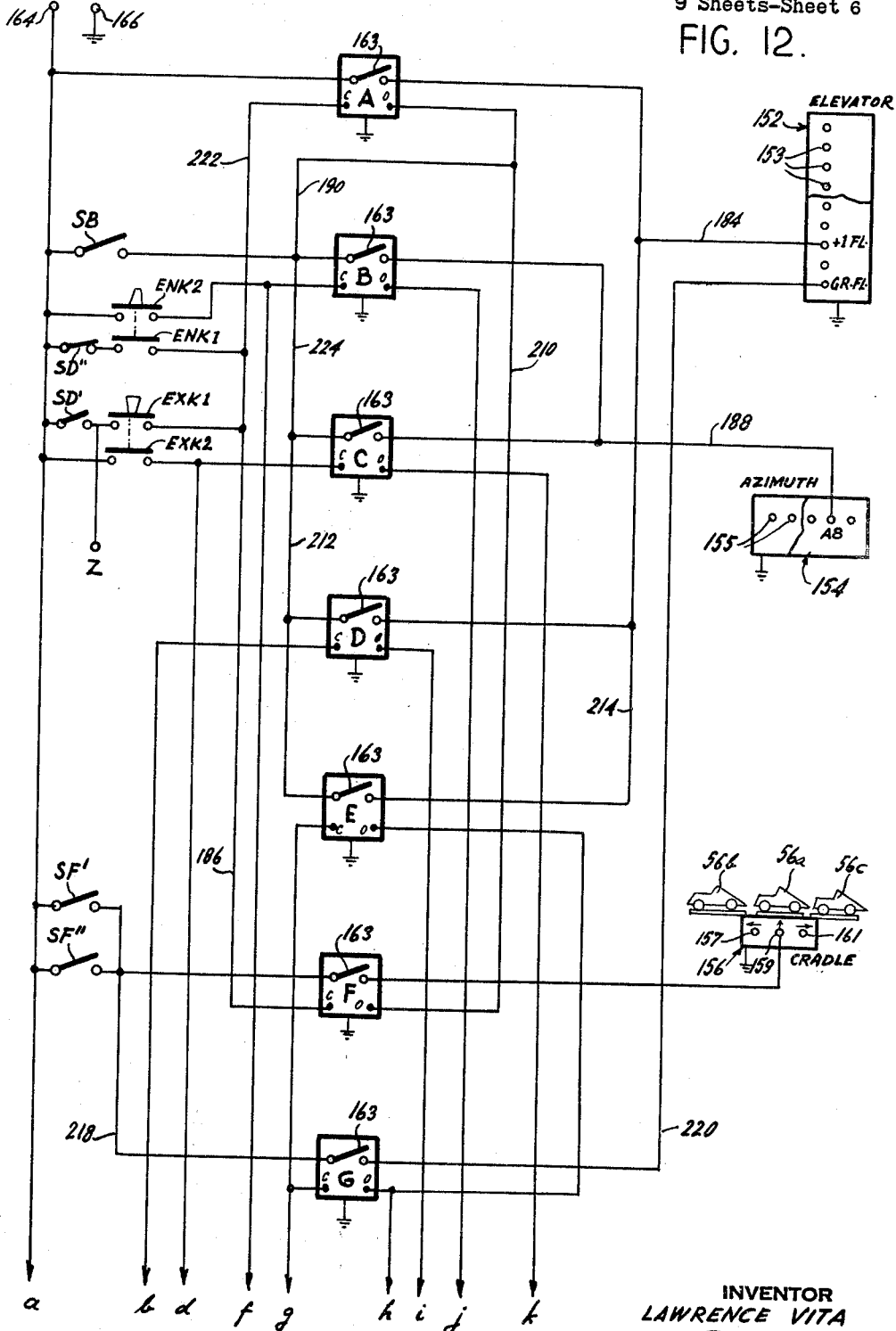

Feb. 24, 1970     L. VITA     3,497,087
AUTOMATIC VEHICLE PARKING SYSTEM
Filed Jan. 19, 1968     9 Sheets-Sheet 8

INVENTOR
LAWRENCE VITA
BY
ATTORNEY

Feb. 24, 1970　　　　　　　L. VITA　　　　　　3,497,087
AUTOMATIC VEHICLE PARKING SYSTEM
Filed Jan. 19, 1968　　　　　　　　　　　　　　　　9 Sheets-Sheet 9
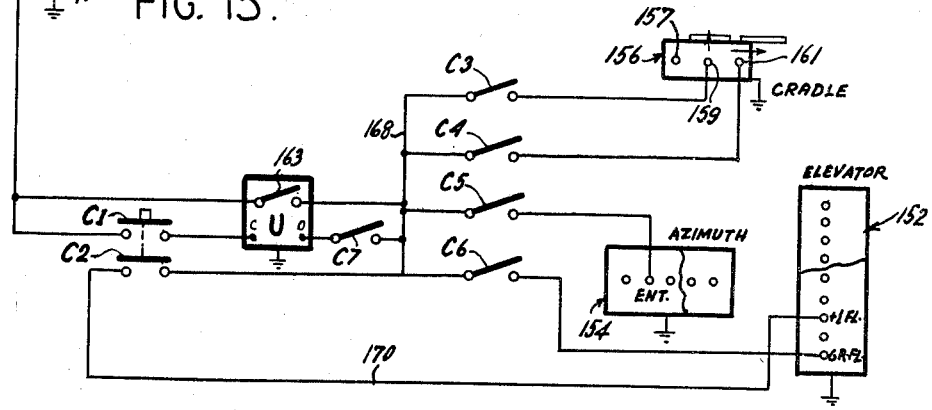
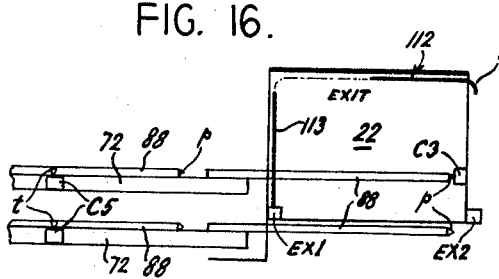
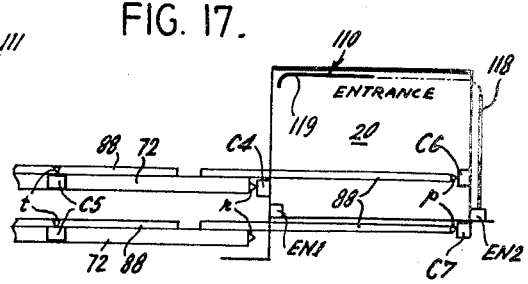
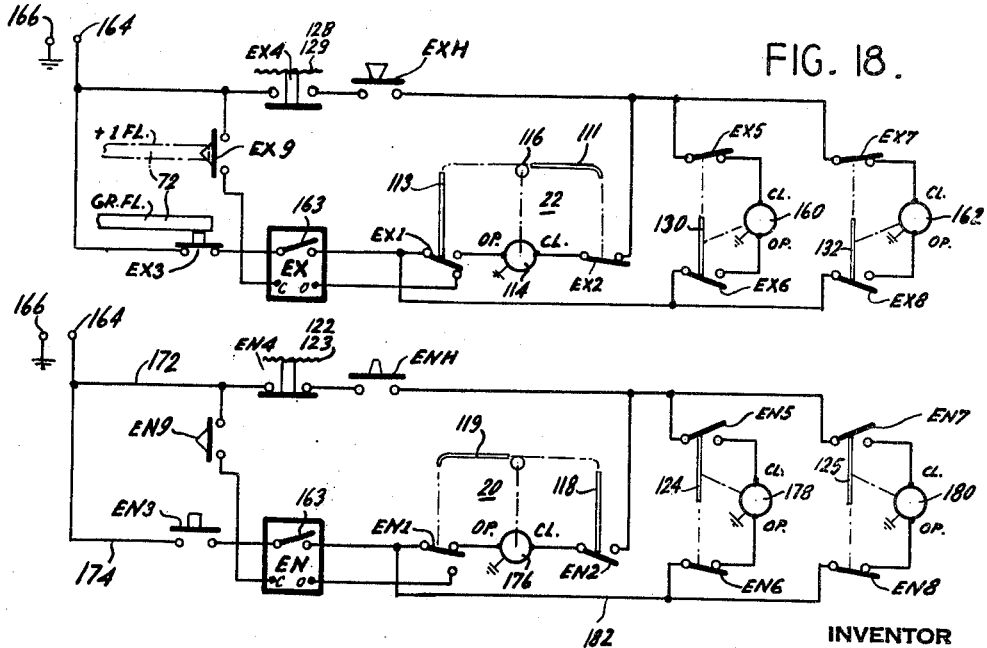
INVENTOR
LAWRENCE VITA
BY
Edward F. Levy
ATTORNEY United States Patent Office 3,497,087
Patented Feb. 24, 1970

3,497,087
AUTOMATIC VEHICLE PARKING SYSTEM
Lawrence Vita, 1521 SW. 21st St.,
Fort Lauderdale, Fla. 33315
Filed Jan. 19, 1968, Ser. No. 699,114
Int. Cl. E04h 6/22
U.S. Cl. 214—16.1                    10 Claims

ABSTRACT OF THE DISCLOSURE

A coin-operated automatic parking system for automobiles including a parking structure having a plurality of tiers with each tier comprising an annular array of parking stalls radially arranged with respect to a central elevator, the parking stalls being erected from simple prefabricated structural components. The central elevator is operative to transport a vehicle automatically from an entrance stall on the ground floor and to deposit it in a preselected available parking stall, and to retrieve parked vehicles selectively from the parking stalls and transport the same to an exit stall on the ground floor. An electrical relay and switching system controls the above mentioned elevator operations as well as the automatic opening and closing of doors at the entrance and exit stalls to provide a safety interlocking relay switching system.

---

The present invention relates to vehicle parking systems and more particularly to a novel automated automobile parking system.

Due to increasing costs of labor and land space, particularly in urban areas, there is a growing demand for fully automated parking systems which make maximum utilization of garage space. Furthermore, particularly in large capacity garages in urban areas, it is important that the parking of vehicles in their stalls and the return of the same to the motorist upon demand, be accomplished in an efficient and rapid manner.

In such a desired automatic parking system, the motorist drives into the garage and disembarks from the car deposits money into a slot to obtain a key corresponding to a particular parking stall, inserts his key in an indexing panel, and actuates an appropriate pushbutton to initiate an automatic operation whereby the automobile is transported to the selected parking stall and deposited therein. Upon his return to retrieve his car, the motorist deposits any money due toward the parking fee, reinserts his key in the appropriate slot in the indexing panel, and actuates an appropriate pushbutton to initiate an automatic operation, whereby the parked car is transported from the parking stall to an exit, the motorist embarks and drives off.

The present invention is not limited to a garage structure having a specific geometrical structural arrangement. In a preferred embodiment, however, the present invention contemplates the radial arrangement of parking stalls to provide maximum utilization of parking space and to provide an efficient and rapid manner of parking and returning automobiles from a central elevator. This radial arrangement of parking stalls, which is particularly suitable for automatic operation, as hereinafter described, has not been adaptable for conventional parking systems because of the requirement for ramps to transport the automobile from one level to another.

It is generally accepted in the construction industry that significant reductions in structure erection costs may be achieved by using standard prefabricated structural components. The parking system of the present invention incorporates a parking stall structure substantially composed of three simple prefabricated frame structures which are easily and rapidly assembled in the erection of the garage structure, thereby minimizing construction time and cost. The assembled structure includes a large number of closely spaced parking stalls and actually constitutes one part of an overall machine which automatically parks vehicles and returns them to their owners as requested.

Furthermore, since the parking system of the present invention, does not require for its operation, the presence of either any attendant or vehicle owner within the garage structure, the safety of persons using this parking system is assured and consequently the simplified assembled garage structure can easily meet building construction codes.

It is an object of the present invention to provide an automatic coin operated parking system which does not require the services of an attendant for its operation and control.

Another object of the present invention is to provide an automatic parking system in accordance with the preceding object which is economically and easily constructed.

Still another object of the present invention is to provide an automatic parking system of the character described which utilizes simple standard prefabricated structural components for erection of the garage structure incorporated in the automatic parking system.

A further object of the present invention is to provide an automatic parking system in accordance with the preceding objects which incorporates a safety interlocking system to ensure safe operation of the subject parking system.

In accordance with the principles of the present invention there is provided an automatic vehicle parking system comprising a vehicle parking structure having a plurality of parking stalls located at a plurality of levels, with each of the stalls including a platform cradle having laterally-spaced tines and sized to support a vehicle thereon, and an elevator for transporting a vehicle to and from preselected levels. A horizontally extensible carriage is mounted on the elevator and includes a carriage cradle sized to support a vehicle thereon, with the carriage cradle having horizontally-extending tines laterally spaced similarly to the stall platform cradle tines.

Means are provided to transport the elevator to render the extensible carriage in alignment with a preselected parking stall. When the carriage is so aligned, the extensible carriage is operative to extend outwardly from the elevator to an extended position wherein the carriage cradle is in substantial vertical alignment with the platform cradle of the preselected stall, with the carriage cradle tines in vertical alignment with the spaces between adjacent platform tines of the preselected stall, and to retract to a central position on the elevator.

There is further provided switching means for selecting a parking stall to receive a vehicle for parking and for signalling the retrieval of a vehicle from a preselected parking stall, and automatic control means operative in response to the switching means for controlling the vertical movement of the elevator, the means for transporting the elevator, as well as the extension and retraction of the extensible carriage.

The features of the invention which are believed to be novel are set forth with particularity in the appended claims. The invention itself, however, both as to its organization and method of operation, together with further objects and features thereof may least be understood with reference to the following description taken in conjunction with the accompanying drawings wherein:

FIG. 2 is a vertical section of the garage structure and elevator as taken along the line 2—2 of FIG. 1, but showing the elevator structure in retracted position with a vehicle centered thereon;

FIG. 4 is a longitudinal section through the elevator platform frame and cradle carriage assembly of the elevator shown in FIGS. 1 and 2, showing the cradle carriage assembly in its extended position;

FIG. 5 is a longitudinal sectional view similar to that of FIG. 4, but showing the cradle carriage assembly in the retracted position.

FIG. 6 is a sectional view on an enlarged scale, taken along line 6—6 of FIG. 5;

FIG. 7 is a partial plan view of the ground floor level of the garage structure and elevator of FIG. 1, showing the exit and entrance stalls, and the cradle carriage assembly extended into the exit stall;

FIG. 8 is a section taken along lines 8—8 of FIG. 7;

Figure 1:
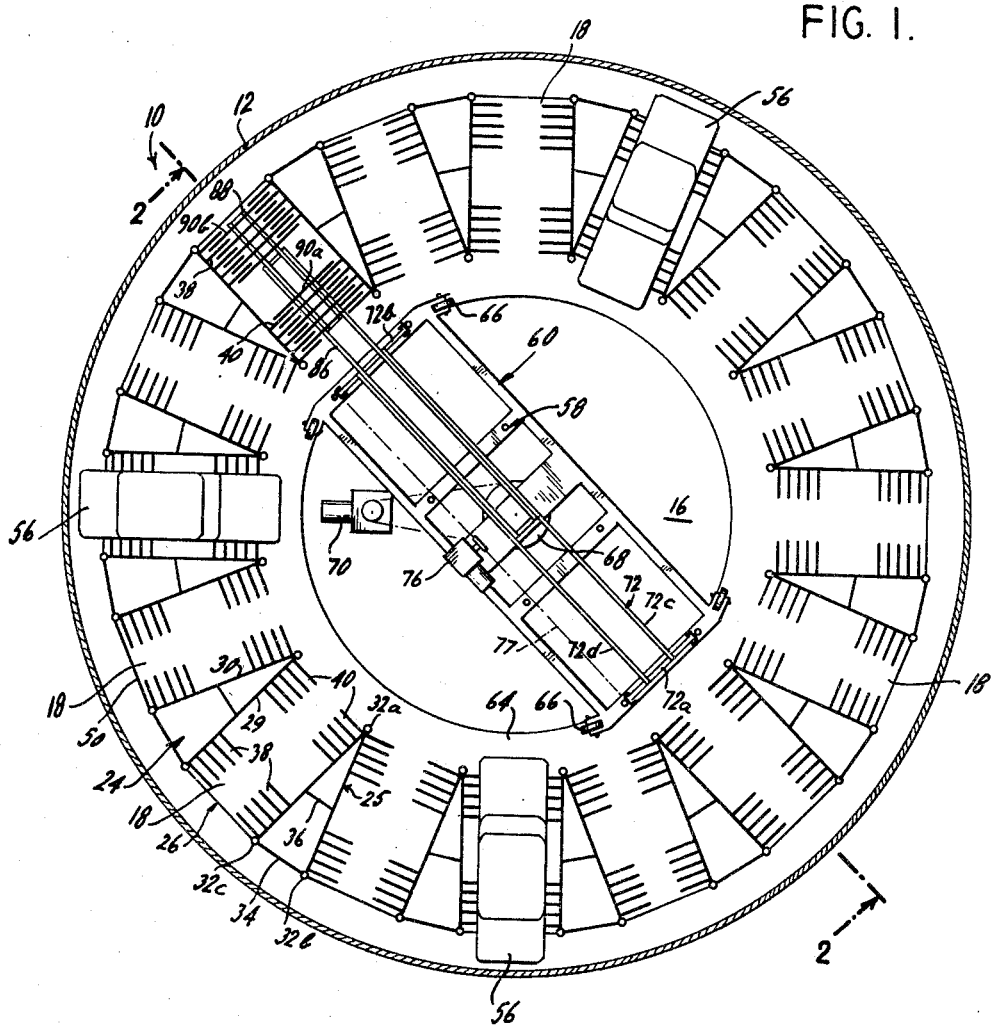
FIG. 1 is a top plan view of a typical upper floor of a garage structure constructed in accordance with the principles of the present invention in a preferred embodiment thereof, with the central elevator structure shown in extended position within a parking stall.
Figure 13:
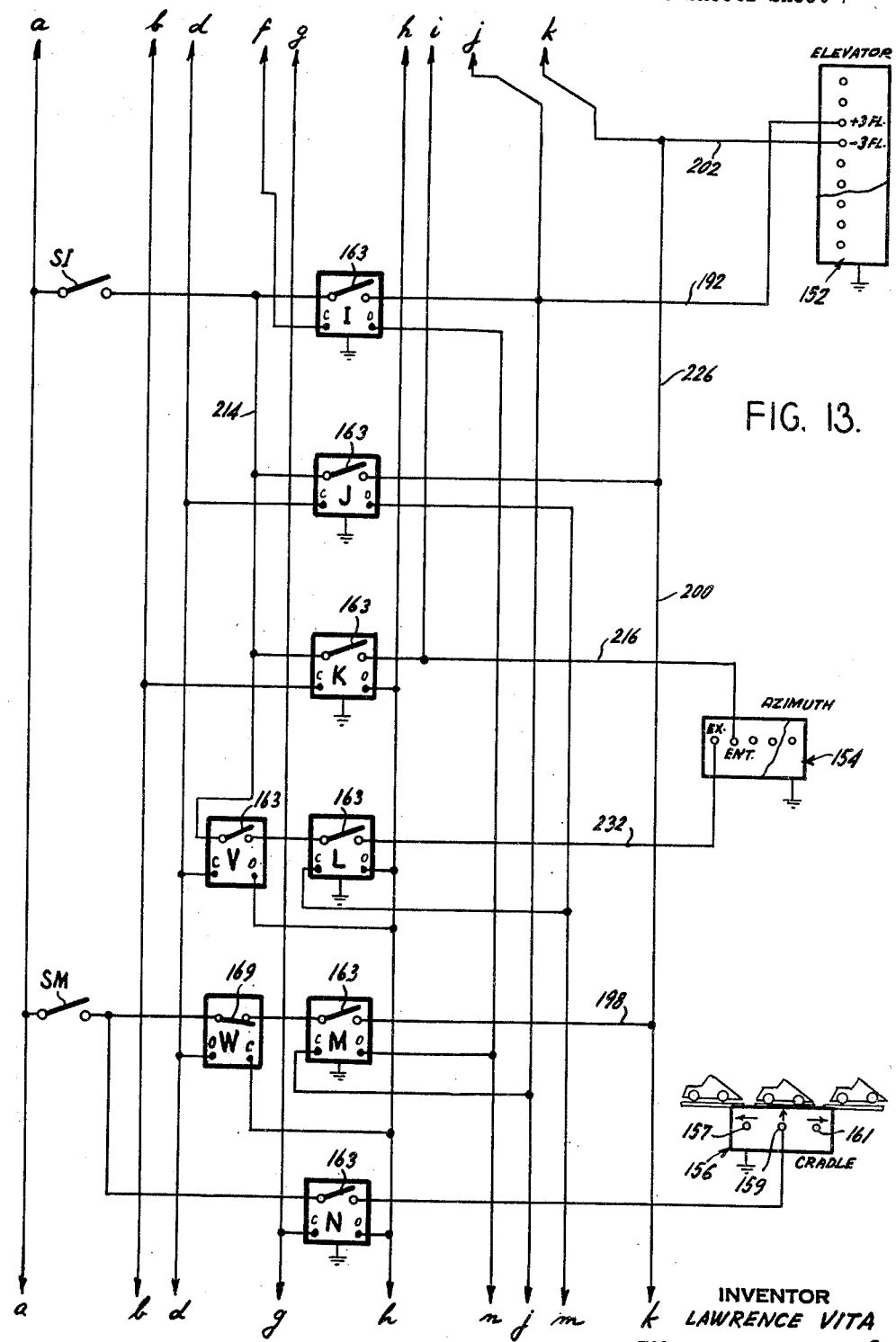
Figure 14:
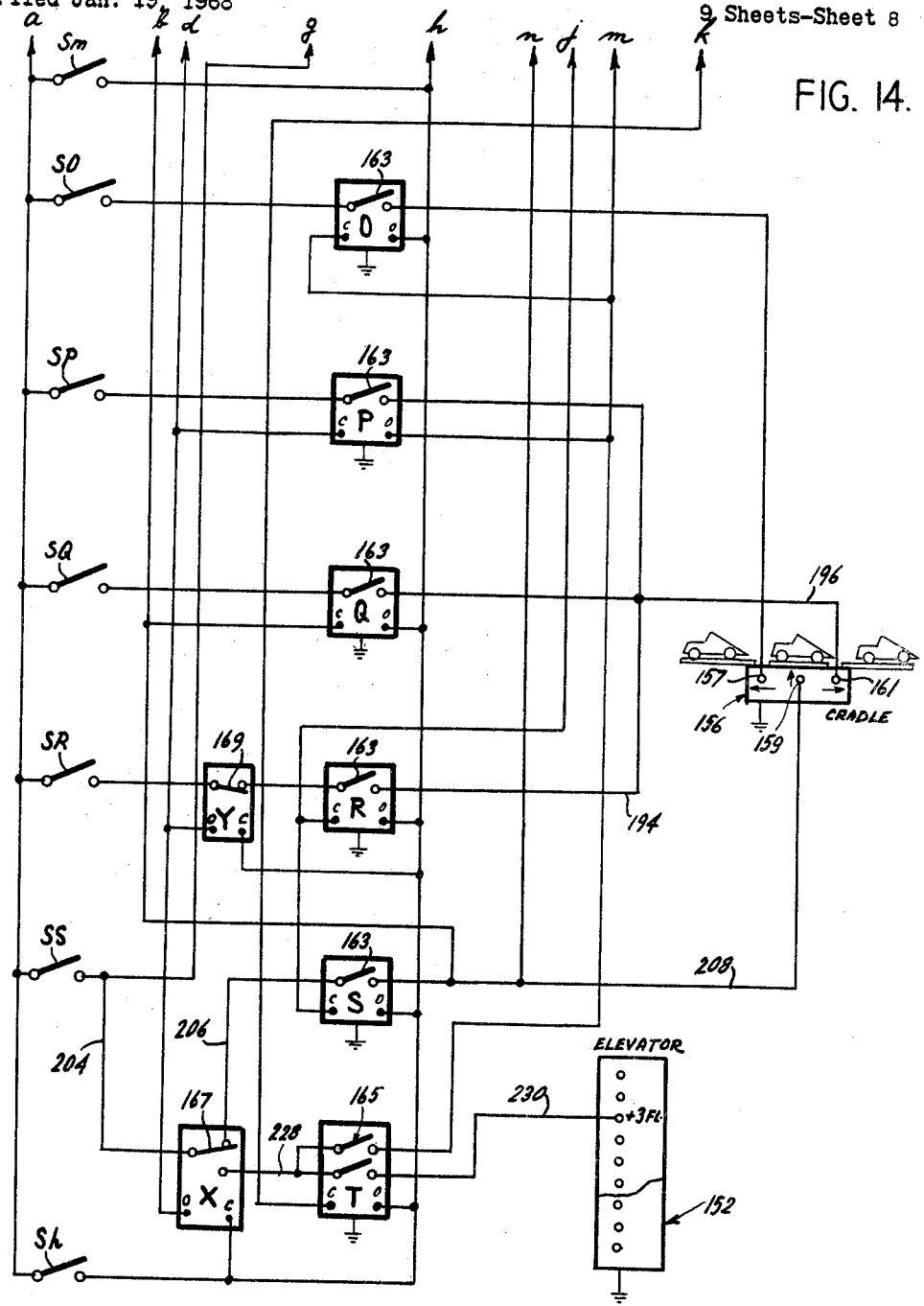

FIG. 9 is a vertical section similar to FIG. 2, but shown schematically, and illustrating the manner in which an automobile is carried by the elevator from the entrance stall to a parking stall, with the same automobile and elevator parts shown in different sequential positions during the parking operation, and with various elevated actuated switches shown schematically to indicate the location thereof;

FIG. 10 is a fragmentary schematic plan view showing a portion of the ground floor of the garage structure of FIG. 1 showing the location of various switches therein and means for actuating said switches;

FIG. 11 is a vertical schematic section similar to FIG. 9, but taken through the exit stall, and showing the first three floors of the structure and illustrating the sequences of removing a parked car from one of the parking stalls and delivering it to the exit stall;

FIGS. 12, 13 and 14 are electrical schematic diagrams of the electric control system employed for the automatic parking and retrieving of automobiles in the structure of the invention;

FIG. 15 is a schematic diagram of the electrical switching system for effecting the transfer of the elevator platform assembly from exit stall to the entrance stall;

FIG. 16 is a diagrammatic view of the exit stall showing the location of the various switches therein, and the operative positions of the elevator platform assembly thereat;

FIG. 17 is a diagrammatic view similar to FIG. 16, but showing the entrance stall and the location of the various switches therein;

FIGS. 18 and 19 are schematic diagrams showing electrical circuits for automatically controlling the various doors of the exit stall and entrance stall respectively.

Figure 3:
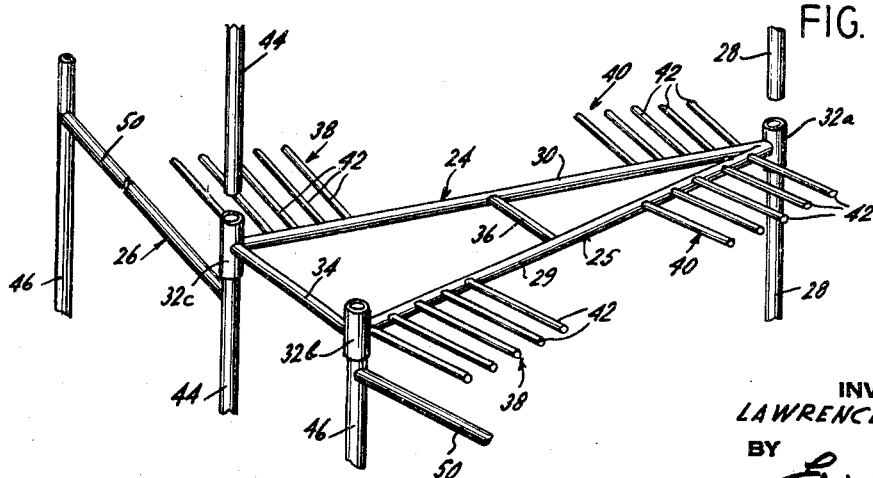
FIG. 3 is a perspective view of the basic structural components of a parking stall constructed in accordance with the principles of the present invention, this view indicating the method of assembly of the components.

Referring to the drawings, and in particular to FIGS. 1–3 there is shown a multi-story garage building 10 having a generally cylindrical shape, and which may be utilized as an open frame structure, or may, if desired, be provided with outer walls 12 and a roof 14. The interior of building 10 is provided with a central elevator 16, and a multi-level lattice-type structure comprising a plurality of radially extending parking stalls 18, at each level arranged in an annular row surrounding the elevator 16.

Referring to FIGS. 1 and 2, six stories in addition to the ground level are known, with sixteen parking stalls 18 being provided in an annular arrangement at each of the six upper levels. The spatial arrangement of parking stalls 18 on the ground floor is similar to that of each of the elevated levels, except that the space of one of the parking stalls 18 is utilized for an entrance stall 20, as showni in FIG. 2 and another for an exit stall 22 (shown in FIG. 7), thereby providing fourteen parking stalls 18 on the ground floor. Thus, building 10 provides a total of one hundred and ten parking stalls.

An important feature of the present invention resides in the simplified and economical method of construction of the multi-level interconnected parking stalls 18 in the lattice-type radial and annular arrangement shown in FIG 1 and 2, by assembly of prefabricated basic framework structural components and connecting rods. FIG. 3 shows these framework components and the method of assembly thereof.

The first of the aforementioned components is in the form of a cradle structure 24 for supporting a parked car, and the other components comprise an H-shaped brace frame structure 26 and a brace support rod 28 for horizontally and vertically interconnecting the cradle structures 24 to provide a rigid interlocking overall structure. Cradle structure 24 comprises a triangular open frame 25 formed by a pair of cylindrical side rods 29, 30 and a base rod 34. The side rods 29 and 30 are joined together at one end and secured to a hollow cylindrically-shaped collar 32a extending perpendicularly to the plane of frame 25. The other ends of side rods 29 and 30 are connected to base rod 34 by respective vertically-extending collars 32b and 32c. Rods 29, 30 and 34 may be tubular, and may, for example, be made of metal piping. Thus, as shown in FIG. 3, collars 32a, 32b and 32c define the three corners of a frame 25 in the form of an isosceles triangle whose equal sides correspond to side rods 29 and 30, and whose base corresponds to base rod 34. In order to provide for increased strength and rigidly, a cross bar 36 interconnects side bars 29 and 30 approximately at their mid points in the plane of frame 25.

Extending laterally from each of side rods 29 and 30 are rear and front stall cradles 38 and 40 spaced apart by a distance corresponding to the wheel base of a vehicle and being thus adapted to support the front and rear wheels of a parked automobile, as described in detail hereinafter. Each of rear cradles 38 comprises a plurality of tines 42 extending perpendicularly from side rods 29 and 30 respectively, with the tines projecting outwardly from the frame 25 in alignment with the plane thereof. Tines 42, which may typically be made of three inch pipe, are equi-spaced along side rods 29 and 30 respectively, approximately at 12 inch centers, with front and rear cradles 38 and 40 extending from side rods 29 and 30 a sufficient distance to safely support the wheel base and tires of any four wheeled automobile on the market today. Furthermore, the above mentioned spacing of tines 42 is such that a car deposited on stall cradles 38 and 40 will be chocked against rolling.

The second of the above mentioned structural components, i.e. H-shaped brace frame 26, includes a pair of parallel vertical pipe members 44 and 46 rigidly interconnected near their upper ends by a cross pipe 50, whose length corresponds to the outside width of an automobile plus the adequate clearance required on both sides thereof for safe parking Vertical members 44 and 46 have a cross-sectional diameter such that the upper ends thereof will fit closely when respectively inserted in collars 32c and 32b, as hereinafter described. Furthermore, vertical pipe members 44 and 46 are of equal length, corresponding to the height of a single story of the multistory parking structure of the present invention.

The base support rods 28, constituting the third structural component of the parking stall assembly, are in the form of vertically disposed pipe members each of the same length as the vertical pipe members 44 and 46, that is to say, corresponding to the height of a single story of the multi-level structure. The support rods 28 are sized to fit snugly within collars 32a for supporting the apex portion of the triangular cradle 24.

In erecting the garage structure, reference to FIGS. 1 and 3 will make apparent the manner of assembling the cradle structures 24 with the brace structures 26 and brace support rods 28 in order to complete the parking stalls. For erecting the ground level of the structure, the H-shaped brace frames 26 are mounted upright in a foundation in a circular row, as indicated in FIG. 1, and are spaced apart by a distance equal to the distance corresponding to the distance between collars 32b and 32c of the respective cradles 24. Similarly, a circular row of support rods 28 are mounted upright in the foundation and are spaced apart sufficiently to receive the collars 32a of respective cradles 24 when the latter are inserted on the mounted brace frames 26 and support rods 28, as will now be described.

The cradles 24 are inserted on the upstanding rows of brace frames 26 and support rods 28, in the manner shown in FIG. 3 to complete the ground level of parking stalls. Specifically, the collars 32b and 32c of each cradle structure 24 are inserted respectively upon the pipe member 46 of one mounted brace frame 46 and upon the pipe member 44 of the next adjacent H-shaped brace frame. At the same time, the collar 32a of the cradle structure 24 is inserted upon the corresponding support rod 28. The ends of side rods 29, 30 and base rod 34 which extend within the collars 32a, 32b and 32c, act as stops to prevent the collars from sliding downwardly upon the respective pipe members 44, 46 and support rod 28.

Each of the triangular cradle structures 24 is mounted as described above to form a circular row as in FIG. 1 and thus complete the ground level of parking stalls. To rigidify the structure, the pipe members 44, 46 and support rods 28 are welded or otherwise secured within the collars 32a, 32b and 32c to provide secure joints. To form the second level of parking stalls, another set of H-shaped brace frames 26 are inserted and secured within the top open ends of the collars 32b and 32c of the mounted triangular cradles 24, and another set of support rods 28 are inserted and secured within the top open ends of the collars 32a, as indicated in FIG. 3. This properly positions the second level of brace frames 26 and support rods 28 for receiving and mounting an annular row of cradle stuctues 24 to complete the second level of parking stalls. The process is repeated level by level until the desired height of the structure is attained.

It will be observed in FIG. 1 that two adjacent cradle structures 24 provide one rectangular parking stall 18. In the annular mounted arrangement of the cradle structures 24 at one level, the side rod 29 of one cradle structure 24 is substantially parallel to the side rod 30 of the next adjacent cradle structure to define the sides of the parking stall 18. The front and rear cradles 38 and 42, carried by these parallel side rods 29 and 30, extend inwardly toward each other to provide supports for the four wheels of the automobile parked in said stall. Thus, in any one parking stall 18, the tines 42 of front cradles 40 carried by the side rod 29 cooperate with the facing tines 42 of the front cradle 40 carried by the side rod 30 to support the front wheels of the vehicle, as may be seen in FIGS. 1 and 2. Similarly, the tines of the facing rear cradles 38 carried by said side rods 29 and 30 cooperate to support the rear wheels of the vehicle.

It will also be appreciated that in the multi-level structure, the parking stalls 18 in the annular rows of each level are aligned with the corresponding parking stalls at the other levels, as clearly shown in FIG. 2, so that the structure comprises a circular arrangement of vertical columns of parking stalls.

It will be noted that tines 42 are cantilevered, and accordingly, when loaded by the weight of a supported vehicle, the weight will produce a torque force on side rods 29 and 30, rather than a direct loading force thereon which would otherwise cause rods 29 and 30 to sag. This feature is particularly advantageous in enabling a framework structure of the type shown herein to be utilized for supporting a large number of automobiles.

Referring to FIG. 2, a central elevator 16 is of the cable and pulley type and is operative to deposit and remove vehicles 56 from each of the parking stalls 18, in a manner to be described hereinafter. Elevator 16 comprises a tower frame structure 58 fixedly mounted on turntable platform 60 which is rotatably mounted on a pedestal 62 and which rolls on circular ledge 64 of foundation 65 by means of casters 66. Turntable platform 60, and hence tower structure 58, may be controllably rotated by means of belt and pulley assembly 68 which is driven by selective operation of motor 70, in the well known and conventional manner. In this way, tower structure 58 may be selectively rotated in the azimuth plane to be positioned in alignment with any preselected multi-level column of parking stalls 18.

As best seen in FIG. 6, the elevator platform frame 72 comprises a pair of spaced end members 72a, 72b interconnected by elongated channel rails 72c and 72d. The platform frame 72 slidably supports an intermediate frame 86, which in turn slidably supports a cradle frame 88 for telescoping action of said three frames in a manner to be presently described.

As shown in FIG. 2, the hoist assembly 74 comprises a pair of endless chains 78 and 79 each trained over and extending between a pair of vertically spaced pulleys or sprocket wheels 84, 85 mounted at the corners of the elevator tower 58, at one side thereof. The chains 78 and 79 are schematically illustrated in FIG. 2 in the form of arrows whose directions correspond to upward movement of elevator platform frame 72. Aligned portions on one run of each chain 78 and 79 are secured at points 80 and 82 to the end portions of the elevator frame 72 at one side thereof. As indicated in FIG. 6, an additional pair of endless chains 78 and 79 are similarly provided at the opposite side of the elevator tower 58, passing over similar pairs of sprocket wheels (not shown) and being secured to the end portions of the elevator platform frame at the opposite side thereof.

Each sprocket wheel 85 shown in FIG. 2 is connected by an elongated shaft to the corresponding sprocket wheel at the opposite lower corner of the elevator tower 58, and mounted on each of these shafts in an intermediate sprocket wheel (not shown). When this intermediate sprocket wheel is driven, the shaft and its end-mounted sprocket wheels 85 are rotated in unison. An endless chain 77, shown in FIG. 2, is trained about and extends between these intermediate sprocket wheels for driving the latter simultaneously. The chain 77 passes over and is operatively coupled to a sprocket wheel 81 driven by electric motor 76.

It will thus be appreciated that the motor 70 may be energized to rotate the entire elevator tower 58 so that the platform frame 72 faces a designated vertical column of parking stalls, and the motor 76 may be energized to elevate or lower the platform frame 72 so that it is aligned with a selected parking stall in the column. While the platform frame 72 is being raised or lowered, the automobile 56 carried thereby will be substantially centered upon said frame 72, as shown in FIG. 2. The telescopic action of the intermediate and cradle frames upon the platform frame provides a means whereby the automobile may be automatically deposited into or removed from a parking stall, as will now be explained.

The intermediate frame 86, as shown in FIG. 6, comprises a pair of spaced channel rails 86a and 86b, mounted on respective wheels or rollers 86c and 86d which ride within the channels of rails 72c and 72d of elevator platform frame 72. These rails 86a and 86b are substantially the same length as the platform frame rails 72c and 72d. The cradle frame 88 is of considerably smaller length and is made only sufficiently long to accommodate a standard automobile. Cradle frame 88 comprises a pair of spaced channel rails 88a and 88b mounted on respective wheels or rollers 88c and 88d which ride within the channels of rails 86a and 86b of intermediate 86.

Cradle frame 88 mounts a pair of front and rear cradles 90a and 90b, each comprising rows of transversely-extending spaced tines 92 (herein illustrated as five tines for each cradle), which tines 92 are spaced apart by distances equal to the distances between the spaced tines 42 of parking stall cradles 24. As shown in FIGS. 1, 6 and 7, the tines 92 are made sufficiently long to project laterally a substantial distance beyond the channel rails 88a and 88b of the cradle frame 88. As shown in FIG. 1, the tines 92 of the respective cradles 90a and 90b are spaced and positioned so that they can interfit with and pass vertically between the tines 72 of the respective rear and front cradles 38 and 40 of the parking stalls 18, whereby a vehicle may be deposited into and removed from any of the stalls, in a manner to be described in detail.

A carriage frame drive motor 94 is mounted upon a bracket 93 secured between the central portions of platform frame channel rails 72c and 72d, as shown in FIGS. 5 and 6. The motor 94 is reversible and can be selectively operated to move the intermediate and cradle frames 86 and 88 from the retracted position shown in FIG. 5, wherein the frames 86 and 88 are centered upon the elevator platform frame 72, and the extended position shown in FIG. 4, wherein the cradle frame is moved outwardly into registry with one of the parking stalls 18. For this purpose, a cable 91 is secured at its ends to cross bars 95 affixed to pairs of brackets 97 secured to the ends of channel rails of intermediate frame 86. An intermediate portion of cable 91 is wound around and drivingly coupled to a drum 96 mounted on the drive shaft of motor 94. Thus, when motor drum 96 is rotated in a counterclockwise direction as viewed in FIG. 5, the intermediate frame 86 is driven in a left-hand direction upon the stationary platform frame 72, and when the sheave 96 is rotated in a clockwise direction, the intermediate frame 86 will be driven to the right. A cable 98 is affixed at one end to a cross-bar 99 extending between and secured to the channel rails 88a and 88b of cradle frame 88, and at its other end is secured to a cross bar 100 bridging and secured to the bracket 93 which is secured to the central portion of stationary platform frame 72. The cable 98 is trained around a pulley 101 mounted on an axle 102 which extends between the brackets 97 secured to one end of the intermediate frame 86.

In a similar manner, a cable 103 is connected at its ends to a cross bar 104 mounted on the cradle frame 108 and a cross bar 105 mounted on the platform frame 72. The cable 103 is trained over a pulley 106 whose axle 107 is mounted on the pair of brackets 97 affixed to the front end of the intermediate frame 86.

It will thus be apparent that when the intermediate carriage 86 is advanced to the left from the retracted position of FIG. 5 to the extended position of FIG. 4 by the motor 94 and cable 91, the cradle frame 88 is automatically advanced to the left from its retracted position of FIG. 5 centered upon the intermediate frame 86, to its extended position of FIG. 4 in which it overhangs said intermediate frame. This extension of the cradle frame 88 is accomplished when intermediate frame 86 moves forwardly relative to the stationary cross bar 105, and carrying the pulley 106 with it. This movement of pulley 106 away from cross bar 105 draws the upper run of cable 103 forwardly, drawing cross bar 104 and its connected cradle frame 8 forwardly relative to intermediate frame 86. A reverse operation is accomplished when the intermediate frame 86 is returned to its retracted position of FIG. 5, the pulley 101 moving away from stationary cross bar 100 and causing cable 98 to draw cradle frame 88 back to its retracted position of FIG. 5 in which it is centered upon intermediate frame 86.

Extension of the frames 86 and 88 in the opposite (i.e. rearward) direction may be accomplished by driving the motor 94 in a clockwise direction when the frames are in their retracted position of FIG. 5. This rearward extension is the normal movement of frames 86 and 88 when a vehicle is inserted into or removed from the parking stalls 18, since the vehicles are deposited therein with their rear ends facing the periphery of the structure and the front ends facing the central elevator tower 58. As will be presently explained, the frames are extended in the forward direction, shown in FIG. 4 only when the vehicle is to be deposited in the exit stall at the ground level.

Referring to FIGS. 7 and 8 the car entrance and exit stalls 20 and 22 respectively are located on the ground floor, whereby to insure the safe transfer of the car to and from cradle carriage 88, as well as the safety of passengers embarking or disembarking from the car. Both entrance and exit stalls 20 and 22 are provided with similar motor driven sliding door assemblies 110 and 112, with exit stall door assembly 112 being shown in FIG. 8. The operation of sliding door assembly 112 will be described with respect to exit stall 22, it being understood that sliding door assembly 110 is operative in a similar manner.

Referring to FIG. 8, door assembly 112 comprises front and rear "roll-down" type slatted doors 111 and 113 driven by motor 114 which is fixedly secured to overhead frame 115. Doors 111 and 113 are secured at one of their ends to motor pulley 116 by a cable 117, whereby doors 111 and 113 act as counterweights for each other. Thus, if door 111 is in the open position, door 113 will be in the closed position, as shown in FIG. 8, and vice versa. Referring to FIG. 7, rear door 113 of exit door assembly 112 is shown in the down position while front door 111 is not shown since it is in the up position. Similarly, in FIG. 7, front door 118 of entrance door assembly 110, is shown in the down position while the rear door 119 (FIG. 17) is not shown, since it is in the up position.

As shown in FIG. 8, exit stall 22 includes a foundation bay 120 which is suitably recessed into the ground floor to receive frames 86, 88 and cradles 90, 90b, so that cradle tines 92 may be received in corresponding recesses of exit bay 120 to be flush with the surrounding portions of the ground floor, to provide a substantially flat surface for the car tires to ride upon. Entrance stall 20 is arranged similarly to exit stall 22, and includes bay 121 which is recessed to receive cradle tines 92 in the same manner as exit bay 120 shown in FIG. 8.

It is to be understood that the entrance bay 121 is shown in FIG. 7 schematically in outline form. Actually, instead of large well portions for receiving the elevator cradles 90a and 90b, a series of corresponding grooves are provided for snugly receiving the individual tines 92 of these cradles. These are illustrated by the grooves 148 illustrated in FIG. 8 for the exit bay 22. Because of the snug fit of the tines 92 within said grooves 148, the surfaces of the entrance and exit stalls are substantially smooth and permit the wheels of a vehicle to roll freely thereover as the vehicle is driven into and out of said entrance and exit stalls.

Within the entrance stall 20, on either side of the recessed bay 121, are weight sensitive platforms 122 and 123, shown in FIG. 7. In alignment with these platforms 122 and 123 are sliding doors 124 and 125, the door 124 leading to vestibule 126 which exits to the exterior of the structure, and the door 125 leading to an entrance control room 127 which likewise exits to the exterior of the structure.

Similarly, within the exit stall 22, on either side of the recessed bay 120, are weight-sensitive platforms 128 and 129 aligned with respective sliding doors 130 and 132 (shown in open position in FIG. 7). The door 130 leads to an exit control room 134 communicating with the exterior of the structure, while door 132 leads to a vestibule 136 which also communicates with the exterior of the structure.

It is contemplated that operation of the parking system of the present invention be completely automatic so as to provide coin-operated, self-service parking. The operation of the control means and safety means for achieving such automatic operation will be described in detail hereinafter. However, the parking and retrieval operation will first be described in general terms in order to facilitate a clearer understanding of the parking system of the present invention.

GENERAL DESCRIPTION OF PARKING SYSTEM OPERATION

In operation, when the parking system is ready to receive a car for parking, elevator tower 58 will be in alignment with entrance stall 20, and said carriage assembly will be in the extended position having cradles 90a and 90b extended into and sunk within entrance bay 121. When front door 118 of entrance stall 20 is opened, the motorist drives his car 56 onto the flushly recessed cradles 90a and 90b, applies the hand brake, and together with his passengers, steps out onto weight sensitive platforms 123 and/or 122. The weight of the motorist and/or his passengers causes either platform 122 and 123 to actuate a voice recording, instructing the passengers to lower the radio antenna, close the car doors, and to leave platforms 122 and 123 through the laterally sliding doors 124 and/or 125. The driver proceeds through door 125 into control room 127 containing a push bottom control panel (not shown), makes a suitable money deposit and selects a key from those available on a key rack (not shown). The removal of the selected key from its slot automatically initiates the following sequence of operations, which occur only if and when both weighted sensitive platforms 122 and 123 are free of passengers.

The elevator platform frame 72 and its slidably mounted frames 86 and 88, which, as pointed out above, are in the extended position supporting car 56, are slightly raised by motor 76 to emerge vertically from entrance bay 109, thereby lifting automobile 56 on elevator cradles 90a and 90b, and the frames 86 and 88 are then retracted by motor 94 onto elevator platform frame 72 to assume the central position shown in FIG. 5. Elevator tower structure 58 is then rotated by means of turntable motor 70 until cradle frame 88 is carrying automobile 56, is aligned in the azimuth with the stall 18 selected to receive the vehicle, and the rear of the automobile 56 is facing the selected stall 18. Elevator platform frame 72 is then driven vertically upward, by means of elevator motor 76 and hoist assembly 74, until it reaches a level which is slightly higher than the level of the preselected stall 18 which corresponds to the key withdrawn, and into which the automobile is to be deposited. This level is indicated by dotted outline 72' in FIG. 2. Frames 86 and 88 are then extended by motor 94 and cables 98 and 103 in the direction of arrow 140 in FIG. 2, until front and rear elevator cradle portions 90a and 90b are disposed directly above front and rear stall cradle portions 40 and 38 respectively.

When the frames 86 and 88 are in the extended position, the position of cradle frame 88 is shown by dotted outline 88' in FIG. 2. In such extended position of cradle frame 88, cradle portions 90a and 90b will be directly above stall cradles 40 and 38 respectively, and tines 92 of cradle portions 90a and 90b will be vertically aligned with the spaces between corresponding tines 42 of stall cradles 40 and 38 respectively.

In the next operation, elevator platform frame 72 is lowered in the direction of arrow 142 to a level slightly below stall cradles 40 and 38, to a position indicated by broken outline 72", whereby elevator cradle tines 92 pass between stall cradles tines 42, and frame 88 passes downwardly through the space between the opposing free ends of stall tines 42 of cradle pairs 38 and 40 respectively. Thus, as cradles 90a and 90b, carrying automobile 56 pass through stall cradles 40 and 38, vehicle 56 will be deposited and left on stall cradles 38 and 40, with the front of the car facing central elevator tower 58.

Frames 88 and 86 are then returned into the retracted position, in the direction of arrow 144 in FIG. 2, by means of drive motor 94, in the manner described hereinabove. When the foregoing retraction operation has been completed, elevator platform frame 72 is ready to return to the ground floor to accept for parking another vehicle at entrance stall 20, or in the alternative to move into registry with another stall 18 for purposes of retrieving a car parked therein.

The operational sequence for retrieval of a parked car from a preselected stall, is substantially the reverse of the operation just described for depositing a car in a parking stall 18. Thus, when it is desired to retrieve a parked car from a preselected stall, the motorist satisfies the meter (not shown) in the exit control room 134 and then inserts and turns his previously obtained key, in a slot (not shown) corresponding to the stall containing his car. This key action actuates a control system which instructs elevator tower 58 to rotate in the azimuth plane to align itself with the preselected stall 18.

Central elevator 16 is then caused to rise to a level slightly below the level of the preselected stall, i.e. to the position shown, for example, by broken outline 72". Frames 86 and 88 are then extended in the direction opposite to arrow 144, whereby carriage cradle portions 90a and 90b are directly below stall cradles 40 and 38 respectively as shown by broken outline 88". Elevator platform 72 is then raised to the position shown by broken outline 72', whereby elevator cradles 90a and 90b lift car 56 from stall cradle portions 40 and 38 until cradle frame 88 reaches a position slightly above stall cradles 38 and 40, indicated by broken outline 88'. Frames 86 and 88 are then retracted in the direction opposite to arrow 140, and elevator platform frame 72, carrying automobile 56, is then lowered to a level slightly above the ground floor.

When elevator platform 72 reaches this ground level, elevator tower 58 is rotated in the azimuth plane until the elevator platform frame 72 is in alignment with the parking stall 18 diametrically opposite to exit stall 22, that is with the rear of the car facing said opposed stall 18. Frames 86 and 88 are then extended in the reverse direction into exit stall 22 (i.e. in the direction opposite to direction arrow 140) so that the automobile 56 moves with its front end leading into exit stall 22, in the direction indicated by exit arrow 146 in FIG. 7. Elevator cradles 90a and 90b are thus disposed over exit bay 120 in the position shown in FIG. 7. Elevator frames 86 and 88 are then lowered into bay 120 with cradle tines 92 being received by the corresponding recesses in bay 120, as shown in FIG. 8, until the car wheels reach the ground level and are deposited thereon.

Exit doors 130 and 132 now open automatically, allowing the motorist and his passengers to enter exit stall 22 and alight on weight sensitive platforms 128 and 129, from which they board the waiting automobile in exit stall 22. After all persons within exit stall 22 board the car, weight sensitive platforms 128 and 129 allow exit door 111 to open, thereby permitting the motorist to drive off.

DESCRIPTION OF ELECTRICAL RELAY CONTROL SYSTEM

Control rooms 127 and 134 are provided with three control systems shown in FIGS. 12 to 15 which include elevator hoist control box 152 for controlling the vertical movement of elevator platform frame 72 as it is driven by elevator motor 76; azimuth control box 154 for controlling the azimuth position of platform frame 72 as it is driven by turntable motor 70; and elevator cradle assembly control box 156 for controlling the extension and retraction of cradle frame 88 and intermediate frame 86 which are driven by drive motor 94. Thus, elevator hoist control box 152 has fifteen switch positions corresponding to the levels slightly above and slightly below each of the seven stories with an extra position for the exit stall 22, azimuth control box 154 has sixteen switch positions corresponding to the sixteen stalls in each story, and elevator cradle assembly control box 156 has three switch positions, one corresponding to the central retracted position, and one each corresponding to the two oppositely extended positions of elevator carriage frames 86 and 88.

FIGS. 9 and 11 are sectional views in schematic form showing the first three levels of the structure. These views show schematically the various switches which are actuated by the elevator assembly to control the parking operations. FIG. 9 shows the entrance stall 20 and illustrates the manner in which an automobile is taken from the entrance stall and deposited within a selected stall on the third level, the same automobile being shown in its various positions during this parking operation. Similarly, FIG. 11 illustrates the manner in which the automobile is removed from the selected stall and brought to the exit stall 22. In these views, for the sake of simplicity, only the elevator platform frame 72 and cradle frame 88 of the elevator structure are shown, the intermediate frame 86 being omitted. Further, in FIGS. 9 and 11 the elevator operting levels slightly above and below a particular floor level (i.e. the stall cradles on that floor) are respectively designated by plus and minus symbols. For example, the levels slightly above and below the second story are respectively designated "+2 Fl." and "—2 Fl." respectively.

FIG. 10 is a partial plan view of the ground floor level and shows the manner in which the azimuth positions of the stalls therein are numbered. Sixteen azimuth positions are indicated beginning with entrance stall 20 which is designated A1 and continuing in counter-clockwise order until parking stall A16, with exit stall 22 being in the A15 azimuth position. Corresponding azimuth positions A1 through A16 are also employed for each of the upper floor levels to indicate the sixteen parking stalls 18 on these upper floors.

Referring to FIGS. 12, 13 and 14, these views are to be considered as a portion of a single continuous drawing, as indicated by the interconnecting lead lines. However, in order to facilitate a clearer understanding of the operation of the switching and relay control system, elevator control box 152, azimuth control box 154 and cradle control box 156 have been depicted repeatedly in FIGS. 12, 13 and 14. It should be understood, however, that in the actual system there is but one of each of the control boxes 152, 154 and 156.

Each of the control boxes 152, 154 and 156 shown in FIGS. 12-15 contains conventional switching circuitry of the type employed in a standard automatic elevator for causing the elevator to be selectively and automatically moved to various floors, as required. It will be appreciated that the utilization of such standard control switching apparatus substantially reduces the cost of the switching and relay apparatus of the present invention.

The elevator hoist control box 152, for example, is operatively connected to the elevator motor 76 (shown in FIG. 2) and its contained switching circuitry will energize the motor 76 in either direction for lifting or lowering the elevator platform 72 to the desired level. The control box 152 has a plurality of input terminals 153, as shown in FIG. 12, each representing a different vertical level to which the elevator platform can be brought, and, as previously indicated, there being fifteen terminals 153 for the illustrated seven-story embodiment. These input terminals 153 function in the same manner as the pushbutton switches in standard elevators, as is well-known to those skilled in the art. That is to say, when any terminal 153 is energized, even momentarily, the controlled switch circuitry will cause the elevator to be raised or lowered to the corresponding floor level and remain there until a subsequent floor level is selected by energizing the proper terminal. In FIG. 12, for example, a lead 184 is shown connected to the terminal 153 corresponding to the +1 Fl. level, and when said terminal is energized through lead 184, the elevator platform frame 72 will be brought to the slightly raised position above the level of the first floor parking stall cradles.

The azimuth control box 154 similarly contains standard switching circuitry to energize turntable motor 70 selectively so as to rotate the platform frame 72 to register with a designated azimuth position A1 through A16. For this purpose, the azimuth control box has sixteen input terminals 155 each corresponding to one of the azimuth positions. In FIG. 12, for example, a lead 188 is shown connected to the terminal 155 corresponding to azimuth position A8, this lead being connected to the energization circuit shown in FIGS. 12–15. It will be understood that the other terminals 155 are also connected to various portions of said energization circuit, but for clarity only one lead connection is shown in FIG. 12 to illustrate one situation.

The cradle control box 156 has three input terminals 157, 159 and 161, which, when energized are effective to drive the cradle extension motor 94 selectively for extending and retracting the elevator cradle assembly between its operative positions. As indicated in FIG. 12, energization of the terminal 157 will extend the cradle frame 88 forwardly as indicated by the automobile position 56b, while energization of terminal 161 extends the cradle frame rearwardly to the automobile position 56c, and energization of terminal 159 brings the frame to its centered, retracted position, indicated by automobile position 56a, from either of its extended positions.

FIGS. 12, 13 and 14 show the electrical switching and relay control circuitry employed to energize selected terminals of the three control boxes 152, 154 and 156 for depositing a car in one of the parking stalls 18, and for retrieving a parked car from one of the stalls 18 and returning it to the ground floor. FIGS. 15, 16 and 17 show the electrical control circuitry for calling for elevator platform frame 72 when cradle frame 88 is located in exit stall 22, which call is initiated, as hereinafter described, by a motorist awaiting for his vehicle in the exit stall, who manually actuates pushbutton switches C1 C2. FIGS. 18 and 19 depict the electrical control circuitry for controlling operation of door assemblies 112 and 110 of exit and entrance stalls 22 and 20 respectively, which is initiated by manually actuating pushbutton switches EXH and ENH respectively.

Referring to FIGS. 12, 13, and 14, the input terminals of control boxes 152, 154 and 156 are connected to and actuated through a series of interconnected and switch-operated relays A, B, ... Y. Each of the relays A through G, I through S, U and V include a single- pole, single-throw working switch 163 which is initially open. Relay T includes a double-pole, single-throw switch 165, while relay X includes a single-pole, double-throw switch 167, and each of relays W and Y include a single-pole, single-throw switch 169 which is closed in the starting position of the circuit. All of the aforementioned relays are of the latching type, so that their switches, once properly actuated will remain either opened or closed until further actuated. Each relay A—Y includes a signal terminal C, which when energized will close the contained switch, and a second terminal O, which when energized will open the switch.

In order to provide current signals to the relays A, B ... Y, and thereby effect energization of selected input terminals of the control boxes 152, 154 and 156, a plurality of push-button type switches are provided on the stall structure and elevator platform frame 72 for actuation by the movable parts of the elevator structure during parking operations. For examples, in FIGS. 9 and 11, one of the third floor stalls 18 is shown as including a pair of switches SR and SP at the inner end of said stall, the switch SR being at the +3 Fl. level while the switch SP is at the —3 Fl. level. These switches are positioned to be engaged and depressed by a finger r on elevator platform frame 72 when the latter is brought to the level of the respective switches. Similar pairs of switches are mounted on the inner ends of the other parking stalls at the various levels and azimuth positions.

It will also be observed in FIGS. 9 and 11 that in the same third floor stall, a pair of switches SM and SS are provided at the outer end of the stall in registry with the +3 Fl. level and —3 Fl. level respectively. These switches SM and SS are located to be depressed and actuated by a finger p on the cradle frame 88 when the latter is extended at the respective level. Similar switches are mounted at the outer end of each of the outer parking stalls. A switch SB is also provided on elevator platform frame 72 at the center thereof, this switch SB being actuated by a finger t on carriage frame 88 when the latter is in its retracted position centered on elevator platform frame 72.

As previously indicated, as a typical example of the automobile parking and retrieving operation, the electrical components for delivering and removing an automobile to the azimuth position A8 at the third floor level have been illustrated and will be described. For a clear understanding of the operation, the various operational stages will be described in sequential order, with the action of the relays in the system traced for various instructions applied to push button switches in control rooms 127 and 134.

STARTING CONDITION OF ELECTRICAL COMPONENTS

As will be presently described, the elevator cradle assembly, after depositing an automobile in a parking stall, will normally return to the entrance stall 20, ready to receive and park the next vehicle, unless it is employed to retrieve a parked automobile. On the other hand, after the elevator cradle assembly has retrieved a parked automobile and delivered it to the exit stall 22, it will remain in the exit stall and the system will deactivate until energized by a motorist. For the example which follows, it is assumed that a motorist, who wishes to park his car, drives up to the entrance stall 20 but finds that the cradle assembly is still in the exit stall 22.

FIG. 15 shows the relay circuit utilized for calling the elevator cradle assembly from exit stall 22 to entrance stall 20. FIGS. 16 through 19 illustrate schematically the operation of the door assemblies 112 and 110 for exit and entrance stalls 22 and 20 respectively.

In the starting position described above, the motorist driving to the entrance stall 20 will find its outer or front door 118 down, while the front door 111 of the exit stall is raised. As shown in FIG. 7, a switch SD″ below the lowered entrance stall front door 118 is depressed by said door and is therefore closed. On the other hand, switch SD′ below the raised exit stall front door 111 is in open condition. In addition, as shown in FIGS. 16 and 18, the elevated exit stall front door 111 is free of an underlying spring-loaded switch EX2 and thus said switch is biased to closed position (FIG. 18), while the lowered exit stall rear door 113 engages and depresses underlying switch EX1. Similarly, as shown in FIGS. 17 and 18, the lowered entrance stall front door 118 depresses underlying switch EN2, while the elevated entrance stall rear door 119 is clear of spring-loaded underlying switch EN1 so that this switch is biased to closed position.

Further, in the starting position, with the elevator cradle assembly dormant in the exit stall 22, the energizing circuit is in the inactive position illustrated in FIGS. 12 through 15, with none of the various relays energized, and no current supplied to any of the control boxes 152, 154 and 156.

It will be seen in FIG. 18 that the exit stall front and rear doors 111 and 113 are driven by the electric motor 114 having a first terminal CL., which when energized, will cause motor 114 to rotate in a direction to close front door 111 (and open rear door 113), and a second terminal OP., which when energized will cause the motor 114 to rotate in the opposite direction and open front door 111. In addition, sliding doors 130 and 132, leading from exit stall 22 to the exit control room 134 and exit vestibule 136 respectively, are shown in FIG. 18 to be driven by respective motors 160 and 162, each having OP. and CL. terminals for opening and closing the respective doors. In the starting position, the sliding exit doors 130 and 132 are open, the door 130 holding open spring loaded limit switch EX6, and being free of closed limit switch EX5. The door 132 holds open limit switch EX8 and is free of closed limit switch EX7.

It will also be seen in FIG. 18 that since there are one or more persons standing on either of the weight-sensitive carpet platforms 128, 129 of the exit stall 22, these loaded platforms maintain normally closed carpet switch EX4 in open condition. Also, since the elevator platform frame 72 is in exit stall 22 at the ground level, as indicated by the legend "GR. FL.," said frame 72 holds normally open switch EX3 in closed condition.

As shown in FIG. 19, the entrance stall front and rear doors 118 and 119 are driven by an electric motor 176 having opening and closing terminals OP. and CL. similar to those described above. Sliding doors 124 and 125 of entrance stall 20 are driven by respective motors 178 and 180, and are shown closed in the starting position, holding open limit switches EN5 and EN7, and being free of closed switches EN6 and 8. Also, weight sensitive carpet platforms 122, 123 of entrance stall 20 are shown to be free of load, so that carpet switch EN4 is in closed position.

The electrical power source for energizing the electrical components of the present invention is indicated by power source terminals 164 and 166 in FIGS. 12, 18 and 19, of which terminal 164 is the "hot" terminal and terminal 166 is the ground terminal.

Referring to FIG. 12 it is seen that when switch SD′ is in closed condition (it being open in starting position), terminal Z will be at the potential of "hot" terminal 164.

TRANSFER OF ELEVATOR CRADLE FROM EXIT STALL TO ENTRANCE STALL

When a motorist arriving at the entrance stall finds the elevator cradle to be at rest in the exit stall, he alights and enters the entrance stall control room 127 from the exterior of the structure, where he depresses push button call switch EXH (FIG. 18). This switch constitutes one of the safety features which isolate all persons from moving parts of the elevator machinery. Accordingly, when switch EX4 is manually depressed, it closes outside door 111 of exit stall 22 and also closes sliding doors 130 and 132 of exit stall 22 by completing the circuit from "hot" terminal 164 to grounded motors 114, 160 and 162, as shown in FIG. 18, it being assumed that the switch EX4 is closed at this time because no persons are standing on exit stall platforms 128 or 129. In addition, the following operations occur:

Closing of exit stall front door 111 depresses and opens switch EX2, while the exit stall rear door 113 is raised to close switch EX1. Closing of sliding doors 130 and 132 opens respective switches EX5 and EX7 and closes respective switches EX6 and EX8, as shown in FIG. 18. In addition, when exit stall front door 111 lowers to closed position it depresses and closes switch SD′, as shown in FIG. 7. As shown in FIG. 12, closing of switch SD′ applies the potential of power source terminal 164 to terminal Z, thereby supplying a source of current to the circuit portion shown in FIG. 15. The motorist now depresses double-pole pushbutton switch C1, C2 (FIG. 15) located in the entrance stall control room 127, thereby applying a current signal from energized terminal Z to signal terminal c of relay U, thereby closing and latching normally open working switch 163 of relay U. The closing of switch C2 applies current from terminal Z to the +1FL terminal on elevator control box 152, via closed working switch 163 of relay U, lead 168, closed switch pole C2, and lead 170. This energization of terminal +1FL on elevator control box 152, causes elevator platform frame 72 in the exit stall 22 to rise from the GR. FL. (i.e. ground floor) level, shown in FIGS. 11 and 18 to the +1FL level within exit stall 22.

Referring to FIG. 16, it is seen that when elevator platform frame 72 rises to the +1FL level, actuating finger p of cradle frame 88 closes switch C3 located at the front of exit stall 22. As shown in FIG. 15, this closing of switch C3 applies a current signal via working switch 163 of relay U and lead 168 to retraction terminal 159 of cradle control box 156, thereby causing cradle frame 88 to retract to its central position. As shown in FIG. 16, the retraction of cradle frame 88 to its central position causes finger t to engage and close switch C5, which, as shown in FIG. 15, applies a current signal to terminal ENT. of azimuth control box 154, corresponding to the azimuth position of entrance stall 20, thereby causing elevator tower 58 to rotate until platform frame 72 faces entrance stall 20.

Referring now to FIG. 17, when elevator platform frame 72 reaches the azimuth position facing entrance stall 20, finger r of elevator platform frame 72 closes switch C4, which, as shown in FIG. 15, applies a current signal to forward extension terminal 161 of cradle control box 156, thereby causing cradle frame 88 to extend into entrance stall 20 at the +1FL level.

When elevator platform frame 72 is at the +1FL level, finger r thereon closes pushbutton switch EN9, shown in FIG. 19, to thereby initiate opening of front door 118 at entrance stall 20, as hereinafter explained.

As seen in FIG. 17, cradle frame 88 extends into entrance stall 20 until finger t thereon engages and closes switch C6. Referring now to FIG. 15 it is seen that this closure of switch C6 causes the application of a current signal to terminal "GR. FL." of elevator control box 152, via closed switch 163 of relay U, lead 168 and closed switch C6, thereby causing extended cradle structure to be lowered to the ground floor level in entrance stall 20.

As seen in FIG. 17, when extended cradle frame 88 is lowered to the ground floor level in entrance stall 20, finger p on cradle frame 88, closes switch C7, which, as shown in FIG. 15, applies a current signal to reset contact o of latching relay U, via closed working switch 163, lead 168 and closed switch C7, thereby causing working switch 163 of relay U to open, whereupon the switching system of FIG. 15 is rendered into its starting, inactive condition.

Referring to FIG. 19, as pointed out above, when the cradle assembly is in the extended position in entrance stall 20 at the +1FL level, the extended cradle structure closes switch EN9 thereby applying a current signal to signal contact c of latching relay EN, thereby causing working switch 163 thereof to close. When elevator platform frame 72 is then lowered to the GR. FL. level, as described above, it engages and closes normally open switch EN3. The closure of switch EN3 causes the application of current via source terminal 164, lead 174, closed switch EN3, closed switch 163 of relay EN, closed switch EN1 to terminal OP. of door motor 176, causing said motor 176 to raise entrance stall front door 118 and lower rear door 119 of entrance stall 20. As seen in FIG. 19, when rear door 119 reaches its lowered position, it opens limit switch EN1 and when front door 118 rises, it releases and effects the closure of limit switch EN2.

In this condition, carpet switch EN4 will be in the closed position as shown in FIG. 19 since no passengers have yet alighted onto weight-sensitive platforms 122 and 123.

When platform frame 72 is in the GR. FL. position at the entrance stall 20, thereby depressing and closing switch EN3, current will be applied to the "OP." terminals of motors 178 and 180 via power source terminal 164, closed switch EN3, closed switch 163 of relay EN and lead 182, and then through closed switches EN6 and EN8 respectively thereby causing sliding doors 124 and 125 respectively, to open.

As seen in FIG. 19 when sliding door 124 is opened, it releases limit switch EN5 allowing it to return to its normally closed position, and opens limit switch EN6. Similarly, when sliding door 125 is opened, it closes limit switch EN7 and opens limit switch EN8.

The motorist now drives his automobile onto cradles 90a and 90b recessed within entrance stall 20, disembarks from his vehicle together with his passengers onto weight sensitive platforms 122 and 123, thereby opening carpet switch EN4, and exits through open sliding door 124 or 125 into entrance control room 127, thereby allowing carpet switch EN4 to return to its normally closed position. The motorist in entrance control room 127 then closes front entrance stall door 118, and sliding control room doors 124 and 125 by closing pushbutton switch ENH, thereby applying current to the CL. terminals of motors 178 and 180 respectively, via power source terminal 164, lead 172, closed switch EN4, closed switch ENH and closed switches EN5 and EN7 respectively, thereby causing control room doors 124 and 125 to close. At this point, the control system is ready to receive instructions to transport the car, which is resting on elevator cradles 90a and 90b, from its position in entrance stall 20 to a preselected parking stall 18 as hereinafter described.

DELIVERY OF AUTOMOBILE TO PRESELECTED PARKING STALL

Referring to FIG. 7, it is seen that when outside entrance door 118 is down, i.e. in the closed position, switch SD″ will be closed. As pointed out above, door 118 and hence switch SD″ is now closed with the car resting in entrance stall 20.

The motorist makes a suitable money deposit and selects a key from those available on a key rack (not shown) in entrance control room 127. Assume that a parking stall is available in the A8 azimuth position on the third floor. He then inserts and turns his key in the slot which corresponds to the available parking stall, the turning of this key thereby closing double-pole switch ENK1 and ENK2 shown in FIG. 12.

Referring to FIG. 12, when double-pole key switch ENK1 and ENK2 are closed the following events take place: (1) A current signal is applied to signal contact c of latching relay A, via source terminal 164, closed switch SD″, and closed switch ENK1, thereby causing switch 163 of relay A to close and applying a current signal to terminal 1FL of elevator control box 152, via source terminal 164, closed working switch 163 of relay A and lead 184. (2) A current signal is applied to signal contact c of relay B, via closed switch ENK2, thereby closing switch 163 of relay B. (3) A current signal is applied to signal contact c of relay I, closed switch ENK2 and lead f thereby closing switch 163 of relay I; and (4) a current signal is applied to signal contact c of relay F via closed switches SD″ and ENK1 and lead 186 thereby closing switch 163 of relay F.

The above-mentioned application of a current signal to terminal +1FL of elevator control box 152 via closed relay A, causes the extended elevator cradle assembly to rise within entrance stall 20 to the +1FL level, where, as shown in FIG. 9, finger p of cradle frame 88 closes switch SF″. Referring to FIG. 12, the aforementioned closure of switch SF″ causes the application of a current signal to terminal 159 of cradle control box 156, via source terminal 164, closed switch SF" and closed switch 163 of relay F, thereby causing cradle frame 88 to retract to its central position.

Referring to FIG. 9, when cradle frame 88 is thus retracted to the central position, finger $t$ on frame 88 engages and closes switch SB. Referring to FIG. 12, it will be seen that the closure of switch SB causes the application of a current signal to terminal A8 of azimuth control box 154, via closed switch SB, closed switch 163 of relay B, and lead 188, thereby causing elevator tower 58 to rotate to the azimuth position of A8 as shown in FIG. 10.

Furthermore, the above-mentioned closure of switch SB causes the application of a current signal to reset contact $o$ of relay A, via closed switch SB and lead 190, thereby causing switch 163 of relay A to open.

As shown in FIGS. 9 and 10, when elevator frame 72, at the +1FL floor level, arrives at azimuth position A8, finger $r$ extending therefrom engages and closes switch SI.

Referring to FIG. 13, it is seen that the closure of switch SI applies a current signal to terminal +3FL of elevator control box 152, via lead $a$ which is connected to source terminal 164, closed switch SI, previously closed switch 163 of relay I and lead 192, thereby causing cradle 90 to rise to +3FL level.

Referring to FIGS. 12–14, it is seen that the above-mentioned closure of switch SI applies a current signal, via closed switch SI, relay I and lead $j$ to the $c$ signal contacts of relays R, S and M, thereby closing respective switches 163 of relays R, S and M. Closed switch SI also applies a current signal to the reset contact $o$ of relay B, also via lead $j$, thereby opening switch 163 of relay B.

Referring to FIG. 9, it is seen that when elevator frame 72 reaches the +3FL level, its finger $r$ engages and closes switch SR. In FIG. 14, it may be seen that closure of switch SR causes the application of current signal to extension terminal 157 of cradle control box 156, via closed switch 169 of relay Y, closed relay R, and leads 194 and 196, thereby causing cradle frame 88 to extend into the parking stall 18 at azimuth position A8 at the +3FL level, with the rear of the car leading, as shown in the upper left hand corner of FIG. 9. When cradle frame 88 reaches its extended position within the parking stall 18 at the +3FL level, finger $p$ on frame 88 closes switch SM which is located at the rear of the stall. Referring to FIG. 13, it is seen that this closure of switch SM applies a current signal to the −3FL terminal of elevator control box 152 via closed switch SM, normally closed switch 169 of relay W, previously closed switch 167 of relay M, leads 198, 200 and 202, thereby causing cradle frame 88 carrying the car, to descend to the −3FL level and thereby depositing the car in parking stall 18 at azimuth position A8 at the third floor. The elevator assembly is now retracted and brought back to the entrance stall at the ground level, as follows:

Referring now to FIG. 9, at the upper left hand corner thereof, it is seen that when extended cradle frame 88 has descended to the −3FL level, its finger $p$ closes switch SS. As shown by FIG. 14, the closure of switch SS applies a current signal to terminal 159 of cradle control box 156, via closed switch SS, lead 204, working switch 167 of relay X, lead 206, previously closed switch 163 of relay S and lead 208, thereby causing cradle frame 88 to retract to its central position.

Referring to FIGS. 12–14, the closure of switch SS also causes the following events: (1) A current signal is applied to the signal contact $c$ of relays G, E and N via lead $g$, thereby closing working switches 163 of each relay G, E and N; (2) a current signal is applied to signal contact $c$ of relays Q, K and D via energized lead 208 and lead $b$, thereby closing working switches 163 of relays Q, K and D; and (3) a current signal is applied to reset contact $o$ of relays M and I via energized lead 208 and lead $n$ thereby closing working switches 163 of relays M and I.

When cradle frame 88 retracts to its central position, caused by the above mentioned closure of switch SS, central finger $t$ extending from cradle frame 88 engages and closes switch SB, as shown in FIG. 9. Referring now to FIG. 12, the closure of switch SB causes the application of a current signal to reset contact $o$ of relay F, via closed switch SB, leads 190 and 210, thereby opening switch 163 of relay F. Furthermore, referring to FIG. 12, the closure of switch SB causes the application of a current signal to terminal +1FL of elevator control box 152, via closed switch SB, leads 224 and 212, closed switch 163 of relay E and leads 214 and 184, thereby causing elevator frame 72 to descend to the +1FL level.

Referring to FIG. 9, when the elevator frame 72 reaches the +1FL level, while still in the azimuth position A8, finger $r$ extending therefrom engages and closes switch SI. Referring to FIG. 13, the closure of switch SI causes the application of a current signal to terminal ENT of azimuth control box 154, via closed switch SI, lead 214, closed switch 163 of relay K and lead 216, thereby causing elevator frame 72 to rotate to the entrance azimuth position. Furthermore, referring to FIGS. 12 and 13, the closure of switch SI causes the application of a current signal to reset contact $o$ of relay D via closed switch SI, lead 214, closed switch 163 of relay K and lead $i$.

Referring to FIGS. 9 and 10, when elevator frame 72 reaches the azimuth position of the entrance stall, i.e. azimuth position A1, at the +1FL level, finger $r$ extending therefrom closes switch SQ. Referring now to FIG. 14, the closure of switch SQ causes the application of a current signal to extension terminal 161 of cradle control box 156, via closed switch SQ, previously closed switch 167 of relay Q, and lead 196, thereby causing empty cradle frame 88 to extend into entrance stall 20, as shown in FIG. 10.

As shown in FIG. 9, when cradle frame 88 extends into entrance stall 20, at the +1FL level, finger $p$ extending from cradle frame 88 closes switch SF" located at the rear of entrance stall 20 at the +1FL level. Referring now to FIG. 12, the closing of switch SF" causes the application of a current signal to terminal GR. FL. of elevator control box 152, via closed switch SF", lead 218, previously closed switch 163 of relay G and lead 220, thereby causing extended cradle frame 88 to descend to the GR. FL. level indicated in FIG. 9, wherein the elevator cradles 90a and 90b are actually below the ground level and are sunk within the entrance stall bay 121.

As shown in FIG. 9, when cradle frame 88 descends to the GR. FL. level in entrance stall 20, its finger $p$ engages and closes switch SM which is located at the rear of entrance stall 20 at the GR. FL. level. As shown in FIG. 14, this closure of switch SM causes the application of a current signal to reset contacts $o$ of relays K, Q, S, G, N and R via lead $h$, thereby reopening the working switches of relays K, Q, S, G, N and R to render the relay control system into its original inactive condition. The elevator cradle assembly is now extended in the entrance stall 20, ready to receive another vehicle for parking, unless, called for from the exit stall control room.

RETRIEVAL OF A PARKED VEHICLE

When the motorist and his passengers enter control room 134 and vestibule 136 adjacent exit stall 22, and desire to retrieve an automobile previously parked in one of the parking stalls 18, the motorist initiates the operation by depressing pushbutton switch EXH located in the exit control room 134. As shown in FIG. 18, closure of switch EXH closes door 111 of exit stall 22 which in turn closes switch SD', shown in FIG. 7. As will hereafter become apparent, the subsequent switching sequence, as hereinafter described, is the same whether, to begin with, the cradle assembly is in entrance or exit stalls 20 or 22 respectively. For purposes of illustration, it will be assumed that the automobile to be retrieved is parked in the stall at azimuth position A8 on the third floor.

The motorist inserts his key into the appropriate slot in exit control room 134, thereby closing coupled switches EXK1 and EXK2, shown in FIG. 12. As shown in FIGS. 12, 13 and 14, since exit front door switch SD' is closed, the closure of switches EXK1 and EXK2 causes the application of current signals to signal contacts c of relays A, C and F, and also of relays J, P, V, W and X through lead d, to close the working switches of said relays A, C, F, J, P, V, W and X. The closure of relay A causes the application of a current signal to the +1FL terminal of elevator control box 152 through lead 184, thereby causing elevator frame 72 to go to the +1FL level. Referring to FIGS. 9 and 11, when the extended cradle assembly rises to the +1FL level, finger p of extended cradle frame 88 closes either switch SF' (FIG. 11) or switch SF" (FIG. 9), depending upon whether the cradle assembly is in exit stall 22 or entrance stall 20. Referring to FIG. 12 it is seen that since switches SF' and SF" are in parallel, the closure of either switch SF' or SF" has the identical electrical effect, so that the switching sequence described hereinafter is the same whether, at this point, the cradle assembly is in entrance stall 20 or exit stall 22.

Referring now to FIG. 12, it is seen that the closure of either switch SF' or SF" causes the application of a current signal to retraction terminal 159 of cradle control box 156, via closed switch SF' or SF", and closed relay F, whereby cradle frame 88 is retracted to its central position. Thereupon, finger t on cradle frame 88 closes switch SB as shown in FIGS. 9 and 11. Referring to FIG. 12, closure of switch SB causes the application of a current signal to reset contact o of relay A, via closed switch SB and lead 190, and the application of a current signal to terminal A8 of azimuth control box 154, via closed switch SB, lead 224, previously closed relay C and lead 188; thereby causing elevator frame 72 to rotate the A8 azimuth position.

As shown in FIGS. 9–11, when elevator frame 72, at the elevated ground level, reaches azimuth position A8, its finger r closes switch SI. Referring to FIG. 13, closure of switch SI causes the application of a current signal to the −3FL input terminal of elevator control box 152, via closed switch SI, lead 214, previously closed relay J, and leads 226 and 202; which causes elevator frame 72 to rise to the −3FL level. Furthermore, referring also to FIGS. 12, 13 and 14, closure of switch SI causes the application of a current signal to reset contact o of relay C, and to signal contact c of relay T, via closed relay J and lead k. As shown in FIGS. 9 and 11, when elevator frame 72 reaches the −3FL level, its finger r closes switch SP.

Referring to FIG. 14, closure of switch SP causes the application of a current signal to extension terminal 161 of cradle control box 156, via closed switch SP, previously closed relay P and lead 196; whereby cradle frame 88 is extended at the −3FL level, and its finger p closes switch SS, as shown in FIGS. 9 and 11. As shown in FIG. 14, closure of switch SS causes the application of a current signal to the +3FL terminal of elevator control box 152, via closed switch SS, lead 204, closed switch 167 of relay X, lead 228, closed switch 165 of previously closed relay T, and lead 230, thereby causing the extended cradle assembly to rise to the +3FL level and thereby lift the car out of the parking stall 18. Furthermore, closure of switch SS applies a current signal to signal contacts c of relays N, G and E through lead g and hence closes these relays. In addition, closure of switch SS also energizes contacts c of relays L and O to close the latter, via closed switch SS, lead 204, closed switch 167 of relay X, lead 228, closed working switch 165 of relay T, and lead m. Further, when closed switch SS energizes the +3FL terminal of elevator control box 152, as shown in FIG. 14, and as described above, it also applies signal current to contact c of relay R for closing the latter. This can be seen in FIG. 13 wherein the energized +3FL input terminal of elevator control box 152 is shown also connected by lead 192 to lead j which extends to contact c of relay R (FIG. 14).

Referring to FIGS. 9 and 11, when the cradle frame 88, extended within the parking stall 18 at azimuth A8 on the third floor, is raised to the +3FL level, its finger p engages and closes switch SM located at the rear of said stall. As shown in FIG. 13, closure of switch SM causes the application of a current signal to retraction terminal 159 of cradle control box 156 via closed switch SM and previously closed relay N, thereby causing cradle 88 (carrying the automobile) to retract to its central position. When cradle 88 reaches its central retracted position, central finger t closes switch SB (FIG. 12), which causes the application of a current signal to reset terminal o of relay F, via closed switch SB and leads 190 and 210, thereby opening relay F. Furthermore, closure of switch SB applies a current signal to the +1FL terminal of elevator control box 152, via closed switch SB, leads 224 and 212, previously closed relay E, and leads 214 and 184; thereby causing elevator frame 72 to descend to the +1FL level while still at azimuth position A8.

As shown in FIG. 11, when elevator platform 72 reaches the +1FL level its finger r closes switch SI, to cause a current signal to be applied to terminal EX of azimuth control box 154, as shown in FIG. 13, via closed switch SI, lead 214, previously closed relays V and L, and lead 232, thereby causing elevator frame 72 to rotate to the azimuth of exit stall 22, i.e. position A15.

When elevator frame 72 reaches the A15 azimuth position, its finger r closes switch SO which is located at azimuth position A7, diametrically opposite to azimuth position A15, as shown in FIGS. 10 and 11, thereby applying a current signal to extension terminal 157 of cradle box 156, via closed switch SO, and closed relay Q, as shown in FIG. 14. The cradle frame 88 is then extended forwardly into the exit stall 22, with the front of the car leading into exit stall 22 as shown in FIG. 11. Referring to FIG. 11 when cradle frame 88 extends into exit stall 22 at the +1FL level, its finger p closes switch SF', thereby applying a current signal to the GR. FL. terminal of elevator control box 152, as shown in FIG. 12, via closed switch SF', lead 218, previously closed relay G, and lead 220, causing cradle frame 88 to descend to the GR. FL. level and thereby depositing the car in exit stall 22. As shown in FIG. 11 when cradle frame 88 descends to the GR. FL. level, its finger p closes switch SH, which, as shown in FIG. 4, applies a current signal to reset terminals o of relays T, O, N, L and G via lead h thereby opening relays T, O, N, L and G and bringing the relay system back to the normal, inactive condition.

It is to be appreciated that for clarity of illustration, FIGS. 9–15 show only those components required to transfer the elevator cradle structure from the exit stall to the entrance stall, to deposit a vehicle in one particular parking stall (namely the stall at azimuth position A8 on the third floor level), and to retrieve the parked vehicle from the same stall. It will be understood that the entire electrical system will include additional series of switches, relays, circuits and other components which operate in the same manner to deliver and retrieve vehicles, as required, to and from the remainder of the parking stalls at each of the levels and each of the azimuth positions.

It will also be appreciated that the parking stall structure including cradles composed of spaced tines, as illustrated in FIG. 3, may have utility in parking structures other than the circular structure shown herein, and may be employed with any type of lift structure having cradles composed of spaced tines which interfit with the tines of the parking cradles.

While a preferred embodiment of the invention has been shown and described herein, it is thus obvious that numerous omissions, changes and additions may be made in such embodiment without departing from the spirit and scope of the invention.

What is claimed is:

1. An automatic vehicle parking system comprising a vehicle parking structure having a plurality of parking stalls located at a plurality of levels with each of said stalls including a cradle sized to support a vehicle thereon, said parking structure comprising a plurality of groups of identical frame components which interfit to form said parking stalls at each level, each frame component comprising a pair of support rods connected together at one end and elongated means connecting the other end of said rods thereby to form a polygonal structure, collar means secured to said one end of said support rods, spaced collar means secured to said other end of said support rods and to said elongated means connecting the latter, vertical support members received in and interconnecting the collar means of frame components mounted in vertical alignment to provide said plurality of levels, and a plurality of vehicle supporting tines mounted on each of said support rods and projecting as a cantilever therefrom in a direction away from the other support rod in the respective frame component, the free ends of the tines of each frame component being spaced from the free ends of the tines of the adjacent frame components at the same level to define parking stalls with a central longitudinal space through each stall, an elevator structure for transporting a vehicle to and from preselected levels and including a horizontally-extensible carriage including a cradle sized to support a vehicle thereon said carriage cradle comprising an elongated central frame having a row of horizontally-extending tines projecting laterally from the opposite sides thereof, the width of said central frame being smaller than the width of said central space in each stall, means for horizontally transporting said elevator carriage to render said extensible carriage in alignment with a preselected parking stall and said central frame in alignment with the central space in said stall, said extensible carriage when in said alignment with said preselected stall being operative to extend outwardly from said elevator structure to move said cradle in a direction parallel to the longitudinal axis of the cradle frame to an extended position wherein said carriage cradle is in substantial vertical alignment with said cradle of said preselected stall and said carriage cradle tines are in vertical alignment with the spaces between adjacent tines of said stall cradle, and to retract to a central position on said elevator structure, switching means for selecting a parking stall to receive a vehicle for parking and for signalling the retrieval of a vehicle from a preselected parking stall, automatic control means operative in response to said switching means for controlling the vertical movement of said elevator, said means for transporting said elevator and said extension and retraction of said extensible carriage.

2. An automatic vehicle parking system according to claim 1 wherein said parking stalls at each level are annularly arranged and extend radially from a central circular area, said elevator structure is mounted in said circular area, and elevator transporting means is operative to rotate said elevator in the azimuth plane to render said carriage in radial alignment with a preselected parking stall.

3. An automatic vehicle parking system according to claim 1 wherein said each of said stalls comprise a first support rod of one frame component and a second support rod of an adjacent frame component, the cantilevered tines of each of said rods extending perpendicularly inward toward the center of said stall and being arranged in groups of spaced tines defining front and rear stall cradles spaced apart along the length of said stall by a distance corresponding to the wheel base of a vehicle, whereby the weight of a vehicle support on said stall cradle cantilevered tines produces a pure torque force on said side rods.

4. An automatic vehicle parking system according to claim 2 wherein said control means comprises elevator control means for raising and lowering said carriage cradle to first and second operative elevations for each selected parking stall, said first operative elevation being slightly lower than the level of said selected parking stall cradle and said second operative elevation being slightly higher than the level of said selected parking stall cradle, azimuth control means for controlling said elevator transporting means to render said extensible carriage in alignment with a selected parking stall, and carriage control means for rendering said carriage into said extended position and said retracted position.

5. An automatic vehicle parking system according to claim 4 wherein said switching means comprises a set of first and second switches in circuit with said cradle control means on the end of each stall proximate to said elevator structure, at said first and second operative elevations, with said sets of first and second switches being accessible for actuation by said elevator structure, third and fourth switches in circuit with said elevator control means and located on the end of each stall remote from said elevator structure and actuable by said horizontally-extensible carriage when said carriage is in said extended position, and a fifth switch in circuit with said elevator control means located on said elevator structure and actuable by said carriage cradle when said carriage is in the said central retracted position.

6. An automatic vehicle parking system according to claim 5 wherein said vehicle parking structure includes an entrance stall and an exit stall at the ground level thereof, door assemblies for said entrance and exit stalls respectively, means responsive to said switching means for individually bringing said door assemblies to open and closed positions for controlling ingress and egress to and from said entrance and exit stalls respectively, and safety interlocking means in circuit with said switching means for preventing operation of the latter to activate said automatic control means unless said entrance and exit stall door assemblies are in said closed positions.

7. A vehicle parking system according to claim 6 wherein said safety interlocking relay means including first and second platform switches located at opposite sides of said entrance stalls and third and fourth platform switches located at opposite sides of said exit stall, said platform switches being operative to render said switching means inoperative when said platform switches are actuated by persons entering and leaving said entrance and exit stalls respectively.

8. A vehicle parking system according to claim 6 wherein said switching means includes a pair of manually actuable switches for controlling the position of said entrance and exit stall door assemblies.

9. A vehicle parking system according to claim 3 in which the tines of the central carriage cradle of said horizontally-extensible carriage define front and rear cradle portions spaced apart by a distance equal to the distance between said front and rear stall cradles, said extensible carriage being operative to extend outwardly to an extended position wherein said front and rear carriage cradle portions are in substantial vertical alignment with said front and rear stall cradles respectively whereby when said carriage in its said extended position is transported vertically with respect to said stall cradles, said elongated carriage frame passes through said elongated space between said pairs of front and rear stall cradles and said carriage cradle meshes with said stall cradle by having said carriage cradle tines passing through said spaces between adjacent stall cradle tines.

10. A vehicle parking system according to claim 6 in which said elevator control means includes means responsive to said switching means signalling the retrieval of a vehicle from a preselected parking stall to lower said carriage cradle to said second operative elevation of said ground level after said carriage cradle supporting a retrieved vehicle has been retracted to said central position on said elevator structure, and in which said azimuth control means includes means responsive to said switching means signalling the retrieval of a vehicle to rotate said carriage cradle into alignment with said exit stall with the front of the retrieved vehicle on said carriage cradle facing said exit stall, said switching means also including a sixth switch in circuit with said carriage control means and positioned to be engaged and actuated by said elevator structure when said carriage cradle is at said second operative elevation of said ground level and in said alignment with said exit stall, to energize said carriage control means for extension of said carriage cradle in a direction opposite to the direction in which said carriage cradle is extended into a parking stall, whereby said carriage cradle is extended into said exit stall with the front of the retrieved vehicle leading.

References Cited

UNITED STATES PATENTS

| | | |
|---|---|---|
| 2,691,448 | 10/1954 | Lontz. |
| 3,175,722 | 3/1965 | Paulssen _____ 214—731 |
| 3,189,198 | 6/1965 | Filak. |
| 3,268,097 | 8/1966 | Armington et al. |
| 3,313,427 | 4/1967 | Inuzuka et al. _____ 214—16.1 |

FOREIGN PATENTS

| | | |
|---|---|---|
| 194,563 | 1/1958 | Austria. |
| 1,029,901 | 5/1966 | Great Britain. |
| 1,043,371 | 9/1966 | Great Britain. |
| 1,107,720 | 8/1955 | France. |
| 1,368,184 | 6/1964 | France. |
| 603,913 | 4/1960 | Italy. |

GERALD M. FORLENZA, Primary Examiner

R. B. JOHNSON, Assistant Examiner